(12) United States Patent
Nakagawa et al.

(10) Patent No.: US 11,876,559 B2
(45) Date of Patent: Jan. 16, 2024

(54) OPTICAL TRANSMISSION SYSTEM AND FIBER TYPE DETERMINATION METHOD

(71) Applicant: FUJITSU LIMITED, Kawasaki (JP)

(72) Inventors: Goji Nakagawa, Sagamihara (JP); Takafumi Terahara, Kawasaki (JP); Hiroki Oi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/876,782

(22) Filed: Jul. 29, 2022

(65) Prior Publication Data
US 2022/0385364 A1    Dec. 1, 2022

(30) Foreign Application Priority Data
Mar. 29, 2022    (JP) .................................. 2022-054247

(51) Int. Cl.
*H04B 10/08*    (2006.01)
*H04B 10/2525*    (2013.01)
*H04B 10/079*    (2013.01)

(52) U.S. Cl.
CPC ... *H04B 10/2525* (2013.01); *H04B 10/07955* (2013.01)

(58) Field of Classification Search
CPC .......... H04B 10/2525; H04B 10/07955; H04B 10/0795; H04B 10/0791; H04B 10/07957; H04B 10/071; H04B 10/07953; H04J 14/0212; H04J 14/021; H04J 14/0202; H04J 14/0201; H04J 14/0204

USPC ........ 398/79, 83, 33, 38, 16, 20, 21, 22, 23, 398/24, 25, 26, 27, 28, 148, 158, 159, 30, 398/31, 32, 10, 13, 17

See application file for complete search history.

(56) References Cited

U.S. PATENT DOCUMENTS

| | | | |
|---|---|---|---|
| 9,755,776 B2 * | 9/2017 | Boertjes | H04J 14/021 |
| 10,547,404 B1 | 1/2020 | Al Sayeed et al. | |
| 11,139,633 B2 * | 10/2021 | Pei | H01S 3/06725 |
| 11,201,667 B2 | 12/2021 | Archambault et al. | |
| 2007/0139774 A1 | 6/2007 | Ohtani | |

FOREIGN PATENT DOCUMENTS

JP    2007-173969 A    7/2007

* cited by examiner

*Primary Examiner* — Hanh Phan
(74) *Attorney, Agent, or Firm* — STAAS & HALSEY LLP

(57) ABSTRACT

An optical transmission system includes a first optical node, a second optical node, and an optical fiber provided between the first optical node and the second optical node. The optical transmission system further includes: a signal generator provided in the first optical node and configured to generate an optical signal including a plurality of wavelength channels and an empty channel; an optical transmission circuit provided in the first optical node and configured to output the optical signal to the optical fiber; an optical channel monitor provided in the second optical node and configured to measure reception power of each channel in the optical signal received through the optical fiber; and a processor configured to determine a type of the optical fiber based on the reception power of the empty channel, the reception power being measured by the optical channel monitor.

11 Claims, 23 Drawing Sheets

FIG.18A
|  | ch1 | ch2 | ch3 | ... | ch96 |
|---|---|---|---|---|---|
| SMF |  |  |  |  |  |
| DSF |  |  |  |  |  |
| NZ-DSF |  |  |  |  |  |
| MIXED 1 |  |  |  |  |  |
| MIXED 2 |  |  |  |  |  |
| ⋮ |  |  |  |  |  |
FIG.18B
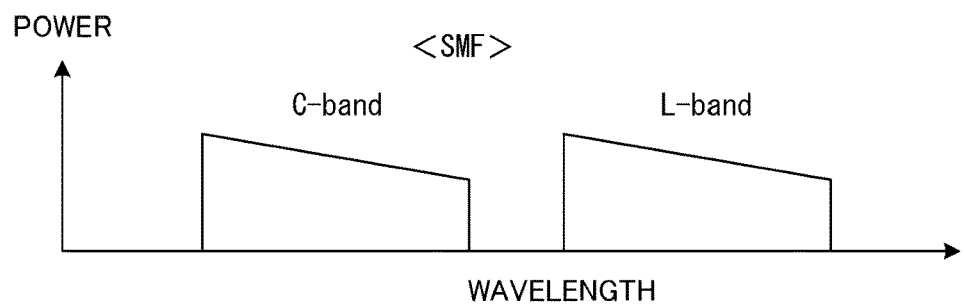
FIG.18C
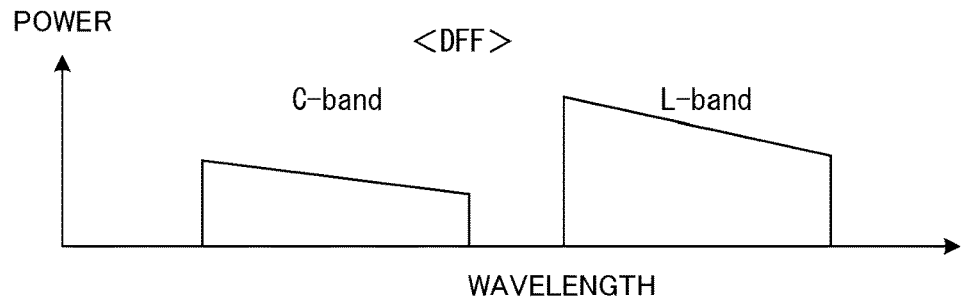
FIG.18D
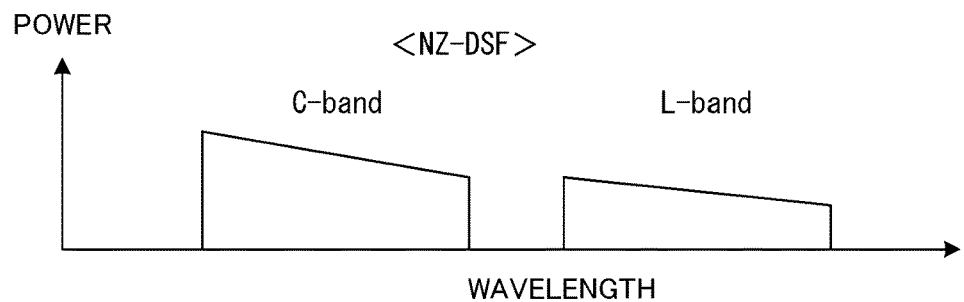

OPTICAL TRANSMISSION SYSTEM AND FIBER TYPE DETERMINATION METHOD

CROSS-REFERENCE TO RELATED APPLICATION

This application is based upon and claims the benefit of priority of the prior Japanese Patent Application No. 2022-054247, filed on Mar. 29, 2022, the entire contents of which are incorporated herein by reference.

FIELD

The embodiments discussed herein are related to an optical transmission system and a method for determining a type of an optical fiber used in the optical transmission system.

BACKGROUND

A type of an optical fiber to be used in an optical communication network is determined in accordance with uses, costs, or the like. In recent years, a single-mode optical fiber (SMF), a dispersion shifted single-mode optical fiber (DSF), a non-zero dispersion shifted single-mode optical fiber (NZ-DSF), or the like has been used in an optical communication network.

An SMF is an optical fiber of which the core diameter is decreased to allow propagation in only one mode. A general-purpose SMF has a zero-dispersion wavelength in a 1310-nm band and is therefore frequently used in a backbone network for which high-quality and stable communications are required with low transmission loss. A DSF has a zero-dispersion wavelength in a 1550-nm band where transmission loss is low, and is therefore frequently used for long-distance transmission. An NZ-DSF has a zero-dispersion wavelength that is slightly shifted from the 1550-nm band. For example, the NZ-DSF has a zero-dispersion wavelength at approximately 1500 nm. Since this configuration suppresses a non-linear effect in the 1550-nm band, the NZ-DSF is suitable for wavelength division multiplexing transmission and is frequently used for ultra-high-speed long-distance transmission.

An optical transceiver and an optical amplifier to be provided on each optical node in an optical transmission system are required to be designed in accordance with a type of an optical fiber. Therefore, a communication carrier checks a type of an optical fiber laid on each span.

FIG. 1 illustrates an exemplary method for detecting a type of an optical fiber laid between optical nodes. For example, in detecting a type of an optical fiber F1 laid between optical nodes N1 and N2, a light source (LD) is connected to one of the optical nodes (N1), and a dispersion measuring instrument is connected to the other optical node (N2). Light output from the light source propagates from the optical node N1 to the optical node N2 through the optical fiber F1. The type of the optical fiber F1 is determined in such a manner that the dispersion of the received light is measured using the dispersion measuring instrument.

A method for estimating a type of an optical fiber, based on reflected light power from an optical transmission line has also been proposed (for example, Japanese Laid-open Patent Publication 2007-173969).

Such a conventional method needs much effort for determining a type of an optical fiber. According to, for example, the method illustrated in FIG. 1, operators need to be positioned at two ends of a target optical fiber. Each span is several kilometers to 100 km. In addition, a large-scale optical communication network includes a large number of optical nodes. Therefore, considerable effort has been spent in determining a type of an optical fiber for each span in the optical communication network.

SUMMARY

According to an aspect of the embodiments, an optical transmission system includes a first optical node, a second optical node, and an optical fiber provided between the first optical node and the second optical node. The optical transmission system further includes: a signal generator provided in the first optical node and configured to generate an optical signal including a plurality of wavelength channels and an empty channel; an optical transmission circuit provided in the first optical node and configured to output the optical signal to the optical fiber; an optical channel monitor provided in the second optical node and configured to measure reception power of each channel in the optical signal received through the optical fiber; and a processor configured to determine a type of the optical fiber based on the reception power of the empty channel, the reception power being measured by the optical channel monitor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 18A-18D illustrate an exemplary method for controlling transmission power of a WDM signal in accordance with a type of an optical fiber;

DESCRIPTION OF EMBODIMENTS

Figure 1:
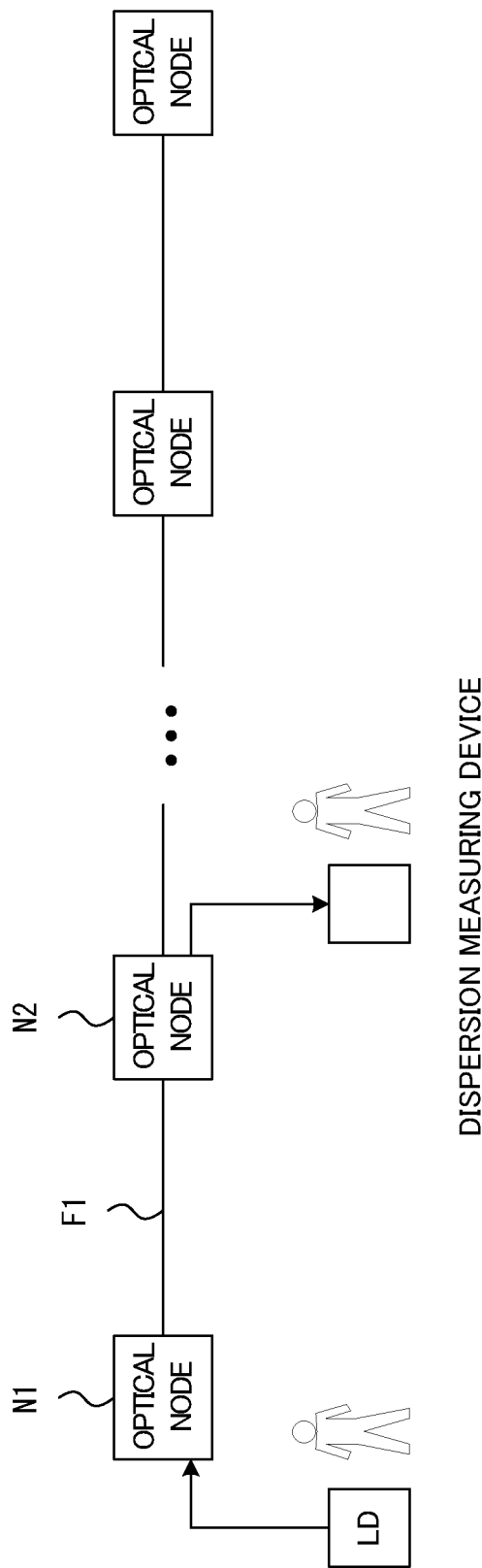
FIG. 1 illustrates an exemplary method for detecting a type of an optical fiber laid between optical nodes.
Figure 2:
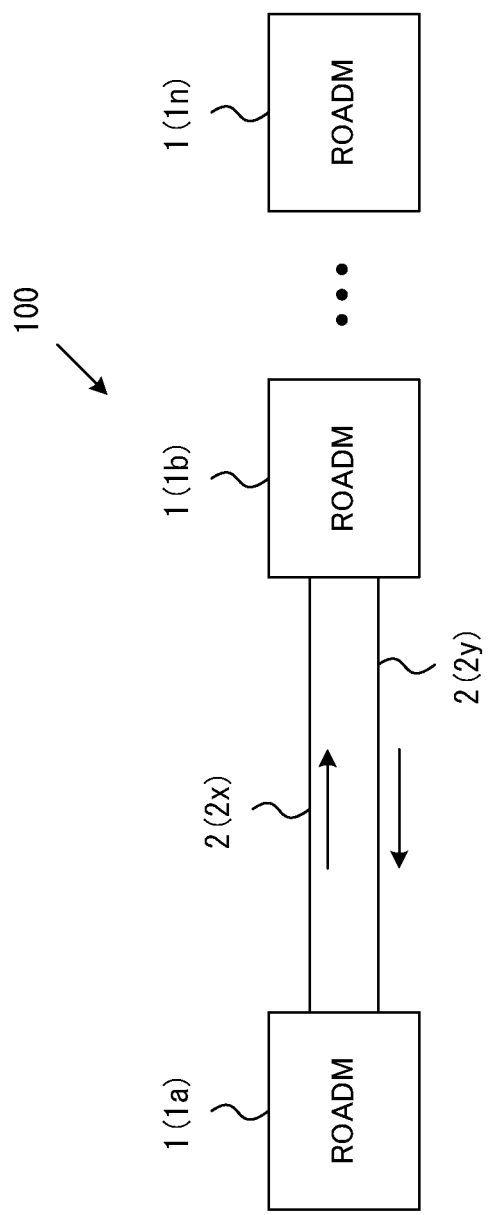
FIG. 2 illustrates an exemplary optical transmission system according to an embodiment of the present invention.

FIG. 2 illustrates an exemplary optical transmission system according to an embodiment of the present invention. An optical transmission system 100 according to an embodiment of the present invention includes a plurality of optical nodes 1 (1a to 1n). Each optical node 1 includes an optical transmission device. The optical transmission system 100 is a WDM transmission system for transmitting a wavelength division multiplexing signal. Therefore, the optical transmission device of each optical node 1 is, for example, a reconfigurable optical add-drop multiplexer (ROADM). In the following description, the wavelength division multiplexing signal may be referred to as a "WDM signal".

The optical nodes 1 are connected to each other with optical fibers 2. Optical signals are transmitted bidirectionally between two optical nodes. For example, an optical signal is transmitted from the optical node 1a to the optical node 1b through the optical fiber 2x, and an optical signal is transmitted from the optical node 1b to the optical node 1a through the optical fiber 2y.

Figure 3:
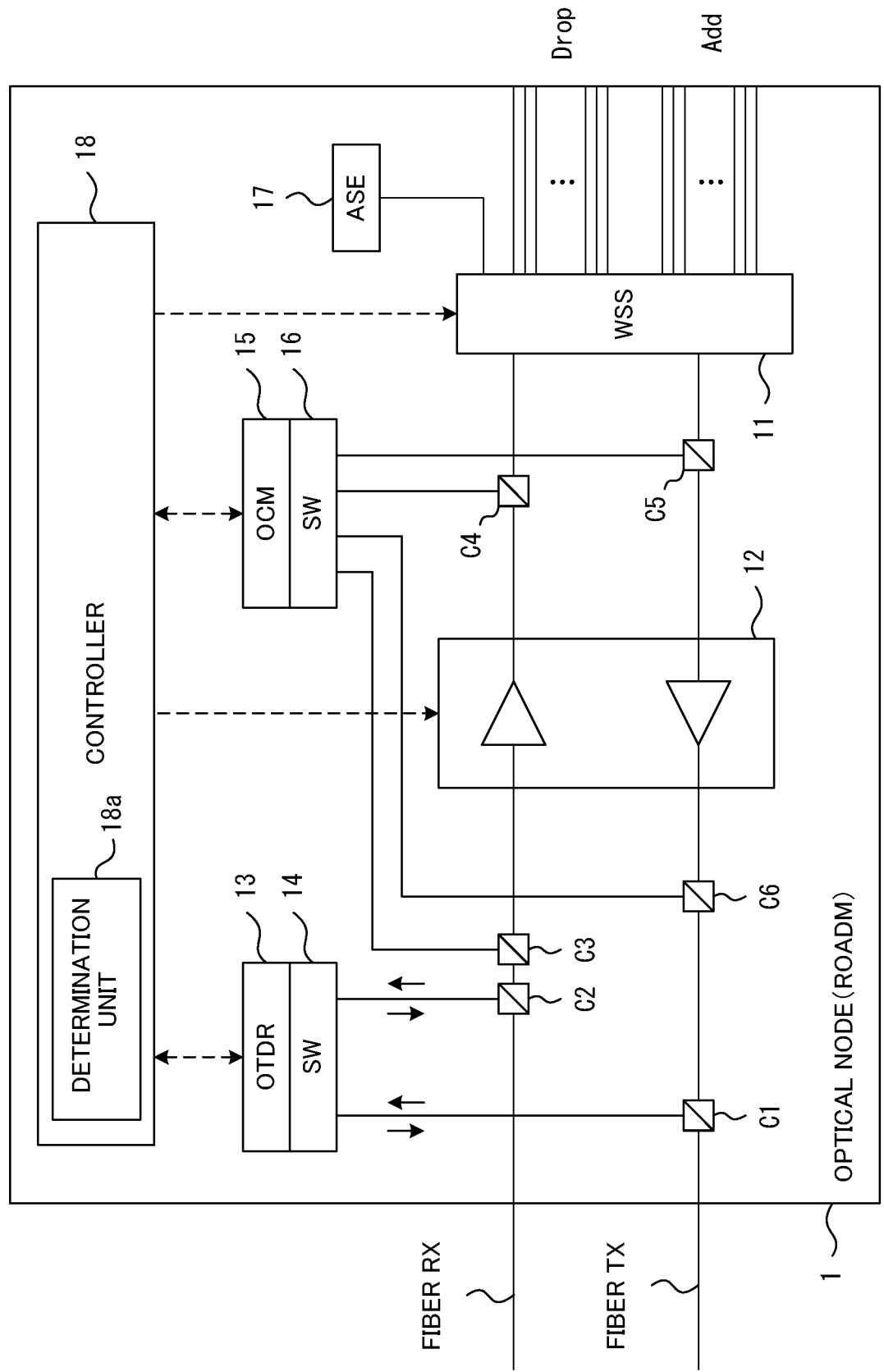
FIG. 3 illustrates an exemplary configuration of an optical node according to an embodiment of the present invention.

FIG. 3 illustrates an exemplary configuration of one of the optical nodes 1 according to an embodiment of the present invention. The optical node 1 includes a wavelength selective switch (WSS) 11, an optical amplifier circuit 12, an optical time domain reflectometer (OTDR) 13, an optical switch 14, an optical channel monitor (OCM) 15, an optical switch 16, an amplified spontaneous emission (ASE) light source 17, and a controller 18. It should be noted that the optical node 1 may include any elements, circuits, and functions not illustrated in FIG. 3. An optical fiber TX and an optical fiber RX are connected to the optical node 1.

The WSS 11 processes a WDM signal including a plurality of wavelength channels. For example, the WSS 11 is capable of inserting an optical signal into an empty channel of the WDM signal, in accordance with an instruction from the controller 18. The WSS 11 is also capable of extracting an optical signal from an instructed one of the wavelength channels by the controller 18. The optical amplifier circuit 12 includes, for example, an erbium doped fiber amplifier (EDFA) and is capable of amplifying a WDM signal. In this example, the optical amplifier circuit 12 amplifies a WDM signal generated by the WSS 11 and also amplifies a WDM signal received through the optical fiber RX. The optical amplifier circuit 12 has a gain to be controlled by the controller 18. The optical amplifier circuit 12 is an example of a transmission light circuit configured to transmit a pseudo WDM signal to be described later.

The OTDR 13 is an optical measuring device configured to detect a discontinuity on an optical fiber. Specifically, the OTDR 13 emits an optical pulse to the optical fiber and detects reflected light from the optical fiber. The OTDR 13 is capable of detecting a position of the discontinuity on the optical fiber, based on power and a timing of the reflected light. It should be noted that the discontinuity on the optical fiber includes a fault location and an end. The discontinuity on the optical fiber also includes a connection between optical fibers. The optical switch 14 configures an optical path between the OTDR 13 and an optical fiber. For example, in measuring the optical fiber TX, the optical switch 14 configures an optical path between the OTDR 13 and an optical coupler C1. Moreover, in measuring the optical fiber RX, the optical switch 14 configures an optical path between the OTDR 13 and an optical coupler C2.

The optical channel monitor 15 is capable of measuring power of each wavelength channel in a WDM signal. The optical switch 16 configures an optical path in accordance with a WDM signal to be measured by the optical channel monitor 15. For example, in monitoring a WDM signal received through the optical fiber RX, the optical switch 16 configures an optical path between the optical channel monitor 15 and an optical coupler C3. In monitoring a reception WDM signal amplified by the optical amplifier circuit 12, the optical switch 16 configures an optical path between the optical channel monitor 15 and an optical coupler C4. In monitoring a transmission WDM signal generated by the WSS 11, the optical switch 16 configures an optical path between the optical channel monitor 15 and an optical coupler C5. In monitoring a transmission WDM signal amplified by the optical amplifier circuit 12, the optical switch 16 configures an optical path between the optical channel monitor 15 and an optical coupler C6.

The ASE light source 17 generates ASE light. It is assumed herein that the ASE light source 17 is capable of generating high-power and broadband ASE light. The ASE light generated by the ASE light source 17 is guided to the WSS 11. The WSS 11 generates a pseudo WDM signal (to be described later), using this ASE light. It should be noted that a combination of the ASE light source 17 and the WSS 11 is an example of a signal generator configured to generate a pseudo WDM signal.

The controller 18 includes a determination unit 18a and controls operation of the optical node 1. For example, the controller 18 instructs the OTDR 13 to measure an optical fiber. In this case, the determination unit 18a determines a type of the optical fiber, based on a result of the measurement by the OTDR 13. Moreover, the controller 18 instructs the WSS 11 to generate a pseudo WDM signal. In addition, when the optical node 1 receives a pseudo WDM signal transmitted from an adjacent node, the determination unit 18a may determine a type of an optical fiber, using the received pseudo WDM signal.

It should be noted that the controller 18 is realized by, for example, a CPU including a processor and a memory. In this case, the processor executes a fiber type determination program stored in the memory, thereby determining a type of an optical fiber connected to the optical node 1. However, a part of functions of the controller 18 may be realized by a hardware circuit.

Figure 4:
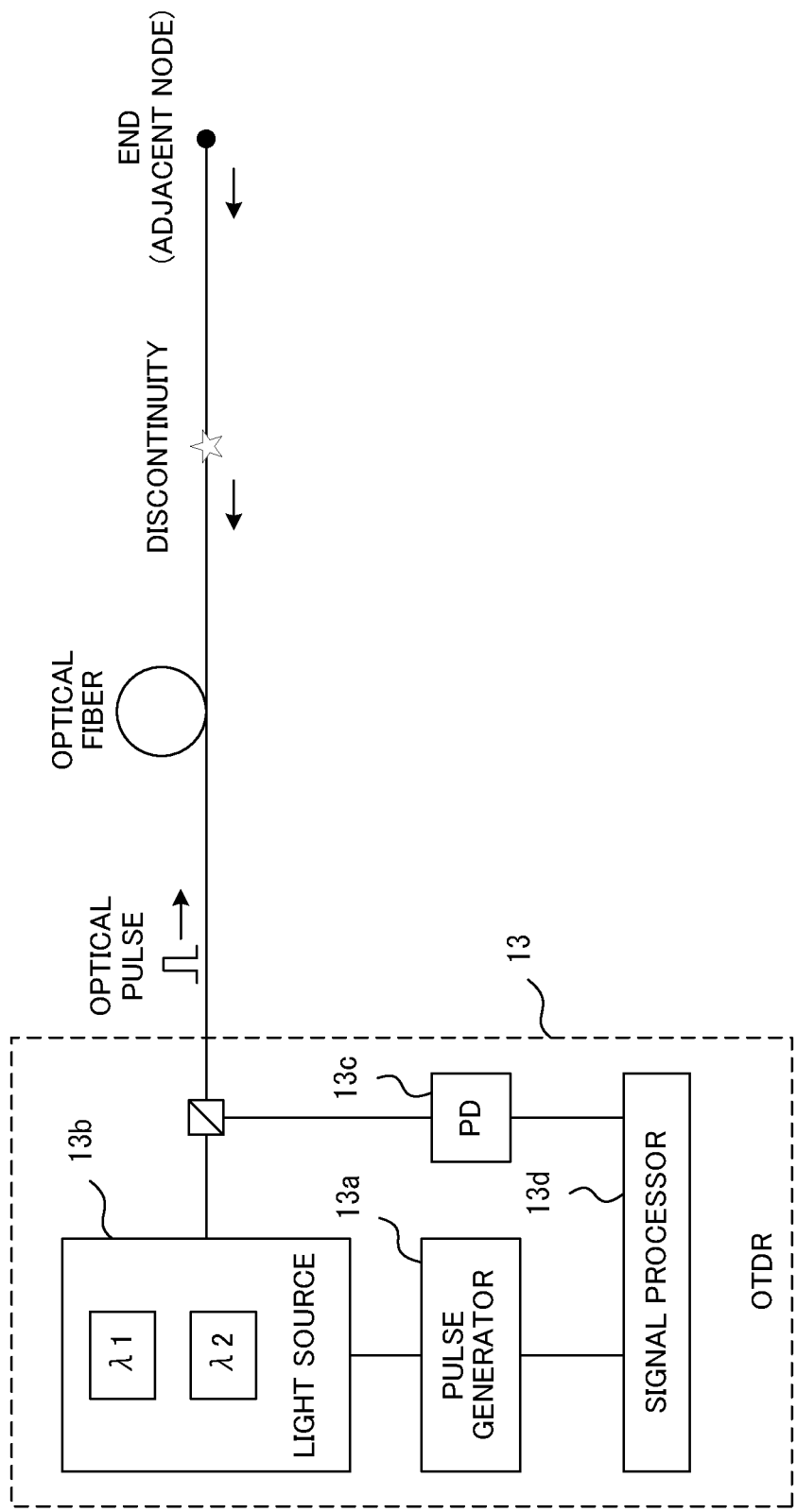
FIG. 4 illustrates an exemplary OTDR.

FIG. 4 illustrates an exemplary OTDR 13. In this example, the OTDR 13 includes a pulse generator 13a, a light source circuit 13b, a photo detector circuit 13c, and a signal processor 13d. The OTDR 13 measures an optical fiber in accordance with an instruction given by the controller 18.

The pulse generator 13a generates a pulse signal in accordance with a generation instruction given by the signal processor 13d. The light source circuit 13b generates an optical pulse in synchronization with the pulse signal generated by the pulse generator 13a. This optical pulse is emitted to a measurement target optical fiber. The light source circuit 13b includes two LD light sources ($\lambda 1$, $\lambda 2$). That is, the light source circuit 13b is capable of generating an optical pulse with a wavelength $\lambda 1$ and an optical pulse with a wavelength $\lambda 2$. Although not particularly limited, $\lambda 1$ and $\lambda 2$ are respectively 1310 nm and 1650 nm, for example.

When the OTDR 13 emits light to an optical fiber, Rayleigh scattering occurs, and part of the backscattering light returns to the OTDR 13. In addition, when Fresnel reflection occurs at a discontinuity on an optical fiber, the reflected light also returns to the OTDR 13.

The photo detector circuit 13c converts the reflected light (backscattering and Fresnel reflection) into electric signals. The signal processor 13d measures a state of an optical fiber, based on an output signal from the photo detector circuit 13c. That is, the signal processor 13d measures a state of an optical fiber, based on reflected light of the optical pulse emitted to the optical fiber.

Figure 5:
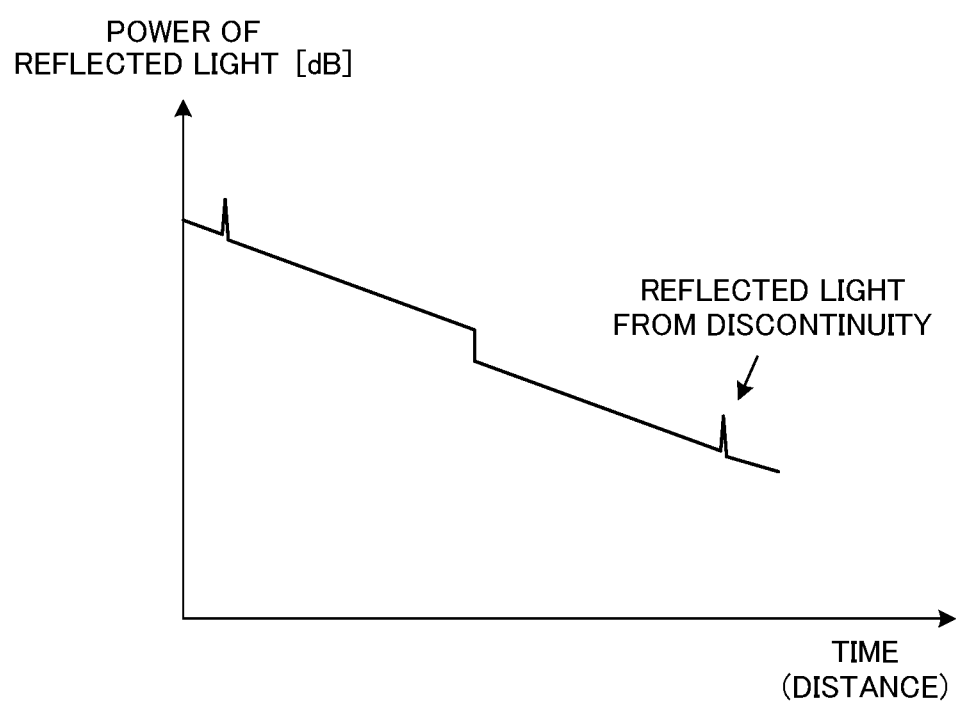
FIG. 5 illustrates an exemplary result of measurement by the OTDR.

FIG. 5 illustrates an exemplary result of measurement by the OTDR 13. In the graph, the horizontal axis represents an elapsed time from transmission of an optical pulse from the OTDR 13. The vertical axis represents power of reflected light from an optical fiber. The reflected light is detected by the photo detector circuit 13c.

The intensity of reflected light caused by Rayleigh scattering depends on a distance from the OTDR 13. In other words, reflected light from a position closer to the OTDR 13 is stronger, whereas reflected light from a position farther from the OTDR 13 is weaker. Therefore, power of reflected light to be detected by the photo detector circuit 13c becomes gradually smaller as an elapsed time from transmission of an optical pulse from the OTDR 13 is longer. However, the photo detector circuit 13c also detects reflected light caused by Fresnel reflection occurring at a discontinuity on an optical fiber. At the timing when the reflected light from the discontinuity is detected, the power of the reflected light rapidly changes. Therefore, measuring the time from the transmission of the optical pulse from the OTDR 13 to the timing at which the power of the reflected light rapidly changes enables calculation of a transmission distance from the OTDR 13 to the discontinuity on the optical fiber. It should be noted that the discontinuity on the optical fiber includes an end of the optical fiber (an adjacent node in FIG. 4).

As described above, the OTDR 13 is capable of detecting the discontinuity on the optical fiber by measuring a propagation time from the transmission of the optical pulse to the reflected light reception timing. This propagation time depends on a wavelength of the optical pulse and a type of the optical fiber.

Figure 6A:
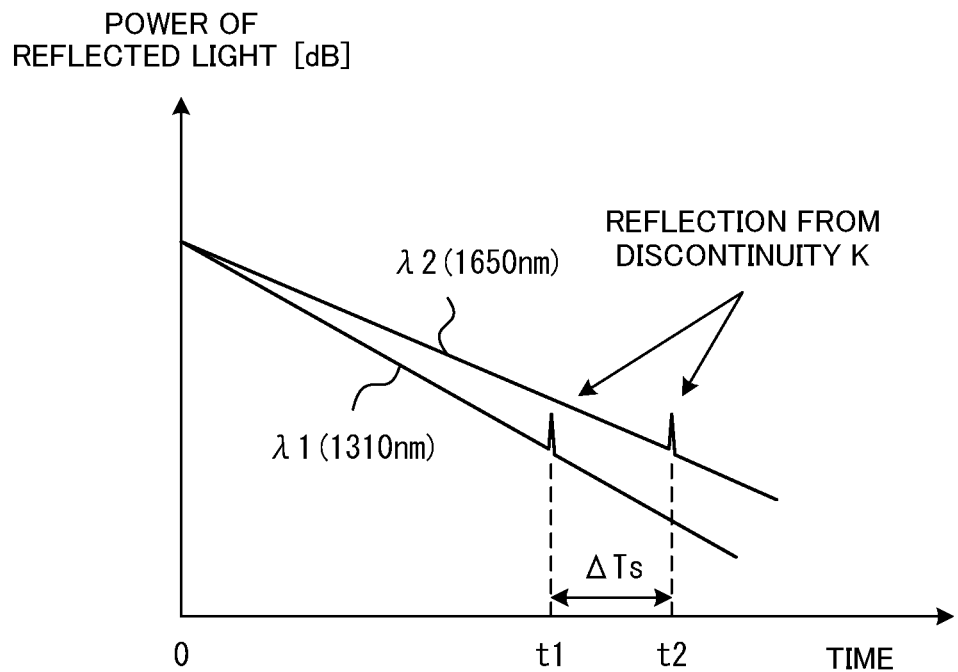
FIGS. 6A and 6B each illustrate a relationship between a propagation time measured by the OTDR and a wavelength.
Figure 6B:
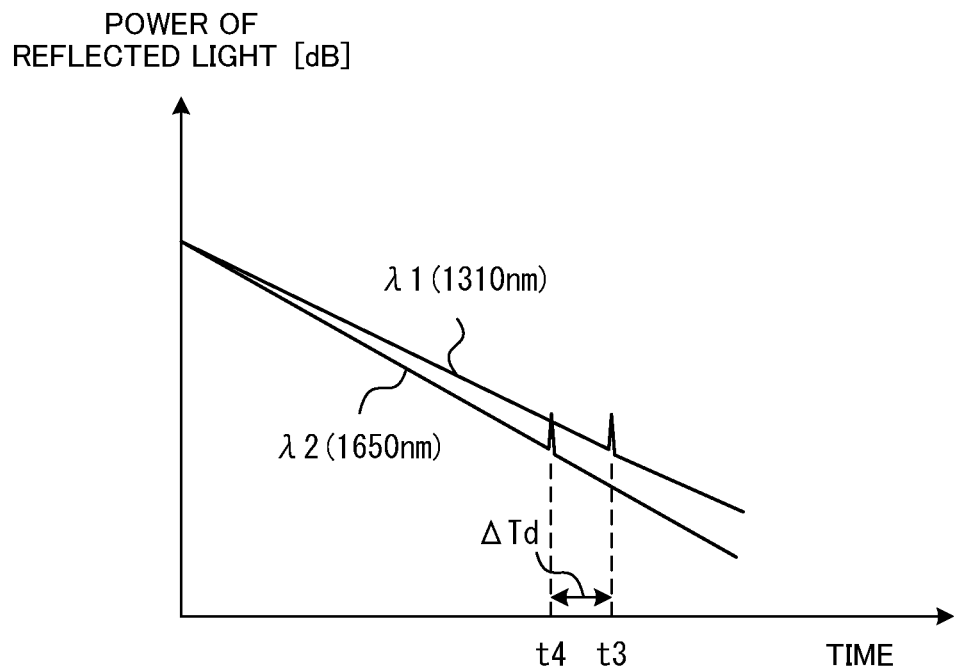

FIGS. 6A and 6B each illustrate a relationship between a propagation time measured by the OTDR 13 and a wavelength. FIG. 6A illustrates a case where a measurement target optical fiber is an SMF, and FIG. 6B illustrates a case where a measurement target optical fiber is a DSF or an NZ-DSF. In this example, a measurement is made on a propagation time until an optical pulse transmitted from the OTDR 13 is reflected at a specified discontinuity point K and returns to the OTDR 13. The discontinuity point K may be an end of the measurement target optical fiber (i.e., an adjacent node).

In the case where the measurement target optical fiber is the SMF, light with a wavelength of 1310 nm (hereinafter, referred to as $\lambda 1$ light) has a propagation time of t1, and light with a wavelength of 1650 nm (hereinafter, referred to as $\lambda 2$ light) has a propagation time of t2. In this example, the propagation time of the $\lambda 2$ light is longer than the propagation time of the $\lambda 1$ light. In addition, a difference $\Delta Ts$ between the two propagation times is relatively large.

In the case where the measurement target optical fiber is the DSF or the NZ-DSF, the $\lambda 1$ light has a propagation time of t3 and the $\lambda 2$ light has a propagation time of t4. In this example, the propagation time of the $\lambda 2$ light is shorter than the propagation time of the $\lambda 1$ light. In addition, a difference $\Delta Td$ between the two propagation times is relatively small.

Figure 7:
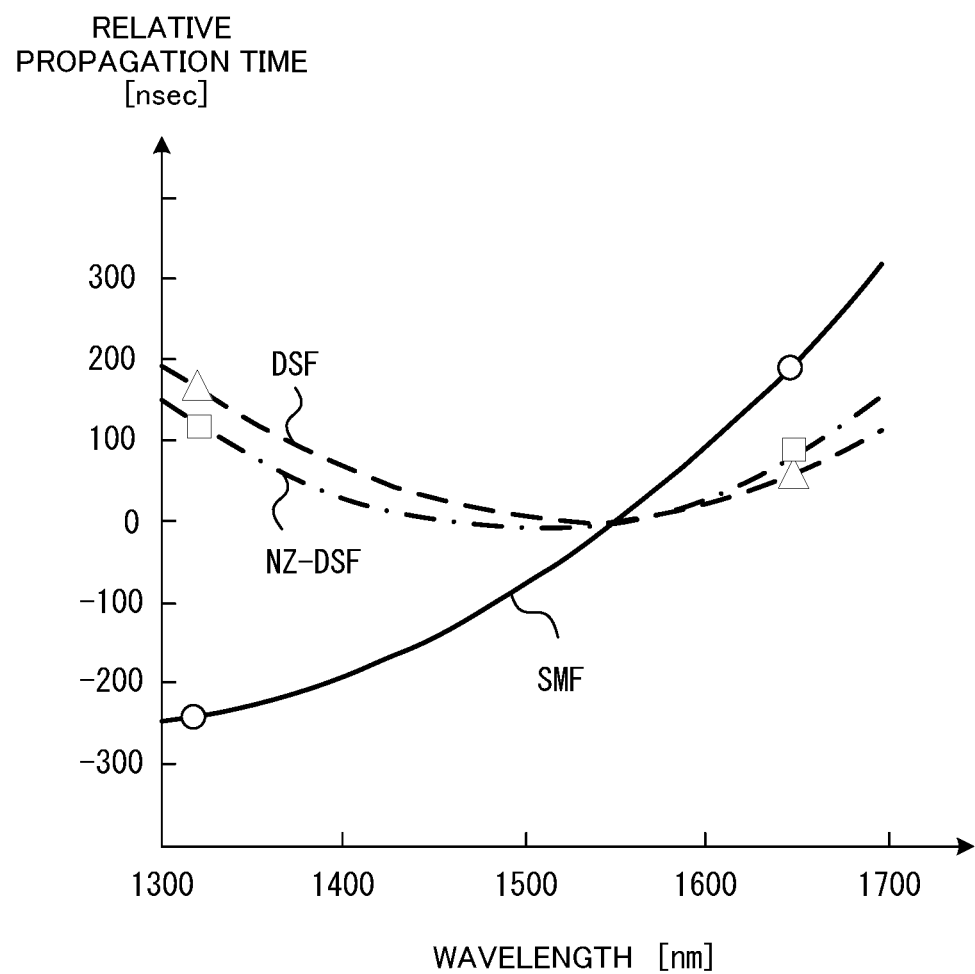
FIG. 7 illustrates a relationship among a propagation time, a wavelength, and a type of an optical fiber.

FIG. 7 illustrates a relationship among a propagation time, a wavelength, and a type of an optical fiber. The horizontal axis represents a wavelength of an optical pulse transmitted from the OTDR 13. The vertical axis represents a propagation time until the optical pulse transmitted from the OTDR 13 returns to the OTDR 13. However, this propagation time indicates a relative value with respect to a propagation time on condition that a wavelength is 1550 nm. In addition, a propagation distance is 100 km. A solid line represents a case where a measurement target optical fiber is an SMF. A broken line represents a case where a measurement target optical fiber is a DSF. A chain line represents a case where a measurement target optical fiber is an NZ-DSF.

The OTDR 13 measures propagation times, using the $\lambda 1$ light and the $\lambda 2$ light as described above. In this example, $\lambda 1$ is 1310 nm and $\lambda 2$ is 1650 nm.

In the case where the measurement target optical fiber is the SMF, the gradient of a curve indicating a propagation time with respect to a wavelength is large. Therefore, as indicated by circular marks, a difference between the propagation time relative to $\lambda 1$ and the propagation time relative to $\lambda 2$ is large. Specifically, the difference between the propagation times is 3.82 nm/km. In this case, the difference between the propagation times is expressed by approximately 7.6×D [nm] in which D [km] represents a distance from the OTDR 13 to a reflection point (i.e., a discontinuity on an optical fiber or an adjacent node).

In the case where the measurement target optical fiber is the DSF or the NZ-DSF, the gradient of a curve indicating a propagation time with respect to a wavelength is small. Therefore, as indicated by triangular marks or rectangular marks, a difference between the propagation time relative to $\lambda 1$ and the propagation time relative to $\lambda 2$ is small. Specifically, for example, the difference between the propagation times about the DSF is −0.85 nm/km. In this case, the difference between the propagation times is expressed by approximately 1.9×D [nm].

Therefore, when setting a specified threshold value, it is possible to identify the SMF and the DSF-based fibers (the DSF and the NZ-DSF). For example, in allowing a variation of 50 percent, a threshold value range for determining whether the measurement target optical fiber is the SMF is 3.8×D to 11.4×D [nm]. Specifically, it is determined that the measurement target optical fiber is the SMF when the difference between the propagation times falls within the threshold value range, and it is determined that the measurement target optical fiber is one of the DSF-based fibers when the difference between the propagation times deviates from the threshold value range. Alternatively, it may be determined that the measurement target optical fiber is the SMF when the difference between the propagation times falls within the threshold value range, and it may be determined that the measurement target optical fiber is one of the DSF-based fibers when the difference between the propagation times is smaller than a lower limit value of the threshold value range.

In the examples illustrated in FIGS. 6A, 6B, and 7, the two wavelengths used by the OTDR 13 are 1310 nm and 1650 nm; however, an embodiment of the present invention is not limited to this configuration. However, if the difference between the two wavelengths is excessively small, the difference between the propagation times becomes small, which may decrease accuracy in determining a type of an optical fiber. It is therefore preferable to increase the difference between the two wavelengths within a range in which an optical loss is small. It is also preferable to use an inexpensive light source in consideration of manufacturing costs of the optical node 1.

As described above, the fiber type determination method according to an embodiment of the present invention is capable of identifying the SMF and the DSF-based fibers. Next, a description will be given of a method for identifying the DSF and the NZ-DSF.

Figure 8:
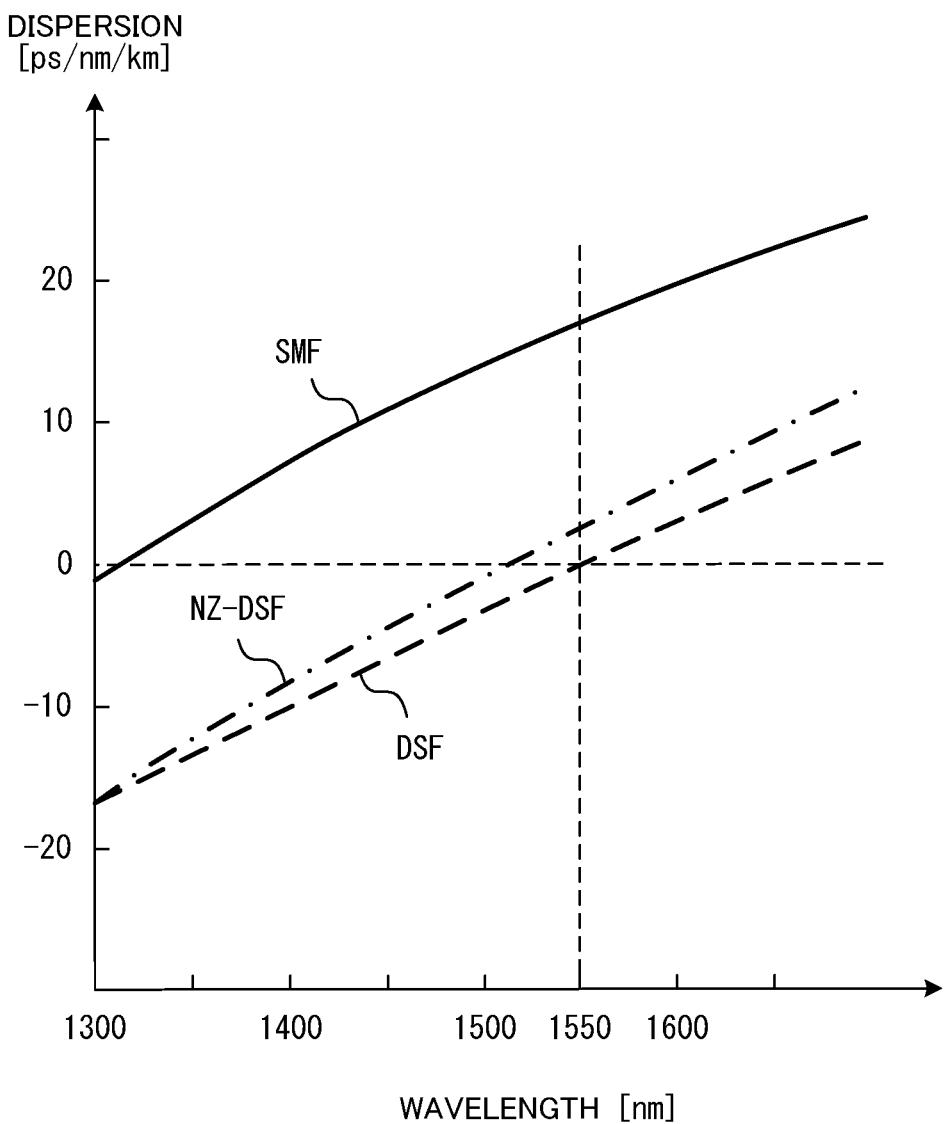
FIG. 8 illustrates wavelength dispersion of an SMF, a DSF, and an NZ-DSF.

FIG. 8 illustrates wavelength dispersion of the SMF, the DSF, and the NZ-DSF. In this example, the dispersion of the DSF at 1550 nm is zero. It should be noted that the NZ-DSF has a zero-dispersion wavelength of approximately 1500 nm.

A non-linear effect in a case where an optical fiber receives multiple light waves with different wavelengths depends on an amount of dispersion. For example, an amount of crosstalk by four-wave mixing (FWM) increases in a zero-dispersion wavelength. Therefore, an amount of crosstalk occurring at 1550 nm in a case where the DSF receives multiple light waves is larger than an amount of crosstalk occurring at 1550 nm in a case where the NZ-DSF receives the multiple light waves. Hence, the fiber type determination method according to an embodiment of the present invention identifies the DSF and the NZ-DSF, using this characteristic.

FIGS. 9A-9D illustrate an exemplary method for determining a type of an optical fiber, using a pseudo WDM signal. The pseudo WDM signal is generated by the ASE light source 17 and the WSS 11, based on an instruction from the controller 18, in the optical node 1 illustrated in FIG. 3.

Figure 9A:
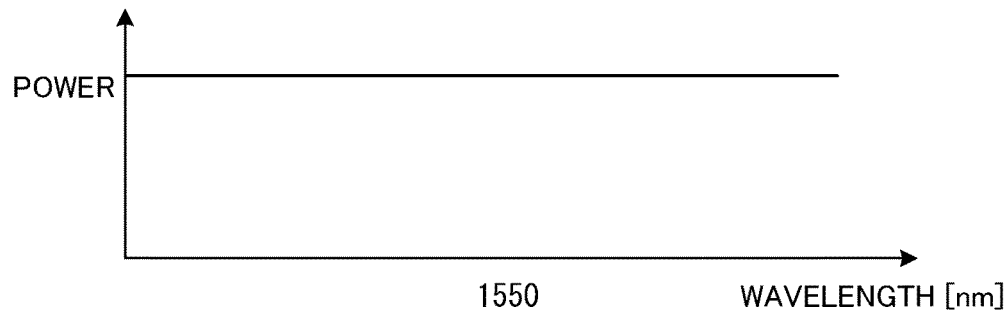
FIGS. 9A-9D illustrate an exemplary method for determining a type of an optical fiber, using a pseudo WDM signal.

FIG. 9A illustrates ASE light generated by the ASE light source 17. The ASE light has large power over a wide band. The ASE light is guided to a specified input port of the WSS 11.

Figure 9B:
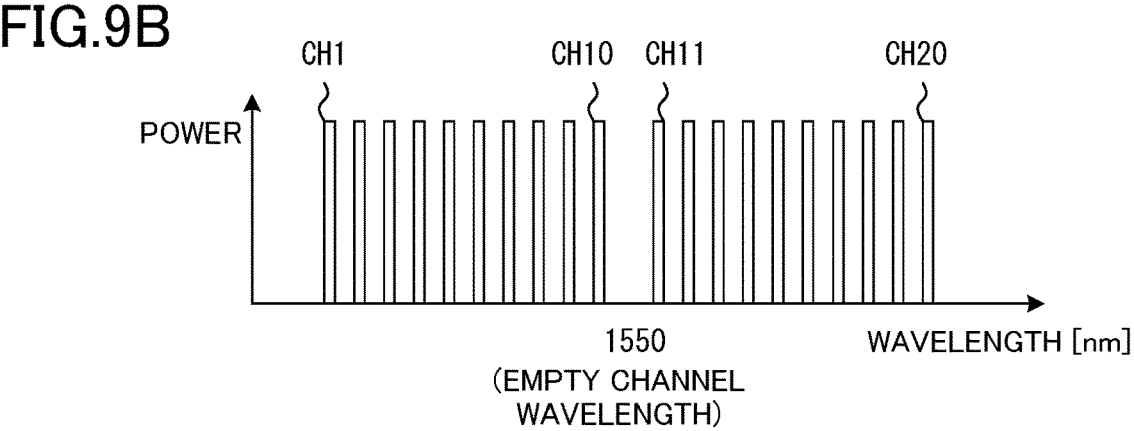

FIG. 9B illustrates an exemplary pseudo WDM signal output from the WSS 11. The pseudo WDM signal is achieved by a plurality of wavelength channels CH1 to CH10 and CH12 to CH21 arranged at specified wavelength spacing. Although not particularly limited, the specified wavelength spacing (frequency spacing) is, for example, 50 GHz. Alternatively, these wavelength channels may be arranged on a frequency grid defined by ITU-T. It is assumed that each wavelength channel has transmission power equal to or more than a specified level. However, no wavelength channel is configured for the zero-dispersion wavelength of the DSF. In other words, an empty channel is configured for the zero-dispersion wavelength of the DSF. The empty channel has transmission power set to be lower than transmission power of at least a wavelength channel for transmitting a signal (i.e., a signal channel). In this example, the zero-dispersion wavelength of the DSF is 1550 nm. As illustrated in FIG. 9B, therefore, no wavelength channel is configured at 1550 nm. The empty channel is preferably configured at the zero-dispersion wavelength of the DSF, but may be configured near the zero-dispersion wavelength of the DSF.

The controller 18 gives to the WSS 11 an instruction to allow transmission of light through the wavelength channels CH1 to CH10 and CH12 to CH21 and to block light with other wavelengths. The WSS 11 processes the ASE light in accordance with this instruction. The WSS 11 thus generates a pseudo WDM signal that transmits the wavelength channels CH1 to CH10 and CH12 to CH21 and in which the optical power at 1550 nm is substantially zero. In the following description, a wavelength for which a wavelength channel is not configured and in which the optical power is controlled to be substantially zero may be referred to as an "empty channel wavelength".

The optical node 1 transmits the generated pseudo WDM signal to the adjacent node. The adjacent node receives the pseudo WDM signal through the optical fiber. In the adjacent node, the received pseudo WDM signal is guided to the optical channel monitor 15. It is assumed that the adjacent node has the same configurations as those of the optical node 1 illustrated in FIG. 3.

Figure 9C:
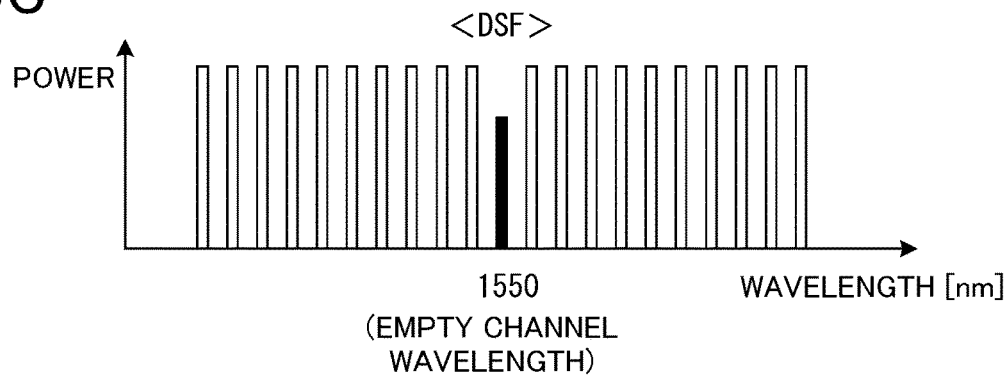
Figure 9D:
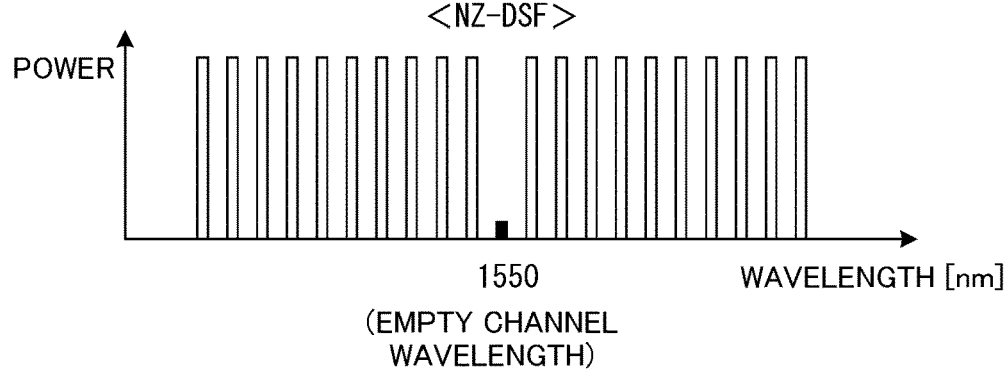

When the pseudo WDM signal propagates through the optical fiber, crosstalk by four-wave mixing occurs. An amount of the crosstalk by the four-wave mixing depends on the wavelength dispersion of the optical fiber. Specifically, large crosstalk occurs in the zero-dispersion wavelength of the optical fiber. The zero-dispersion wavelength of the DSF is 1550 nm. Therefore, in a case where the optical fiber through which the pseudo WDM signal propagates is the DSF, large optical power is detected at 1550 nm as illustrated in FIG. 9C. In contrast to this, the zero-dispersion wavelength of the NZ-DSF is shifted from 1550 nm. Therefore, in a case where the optical fiber through which the pseudo WDM signal propagates is the NZ-DSF, small optical power is detected at 1550 nm as illustrated in FIG. 9D. Although not particularly illustrated, also in a case where the optical fiber through which the pseudo WDM signal propagates is the SMF, small optical power is detected at 1550 nm.

As described above, when the optical node 1 transmits the pseudo WDM signal to the adjacent node, the adjacent node is capable of determining whether the optical fiber between the optical node 1 and the adjacent node is the DSF, based on the optical power detected in the empty channel wavelength. Specifically, it is determined that the optical fiber between the optical node 1 and the adjacent node is the DSF when the optical power detected in the empty channel wavelength is larger than a specified threshold value. On the other hand, it is determined that the optical fiber between the optical node 1 and the adjacent node is a fiber different from the DSF (the NZ-DSF or the SMF) when the optical power detected in the empty channel wavelength is smaller than the specified threshold value.

It should be noted that the fiber type determination method according to an embodiment of the present invention uses large crosstalk occurring in the zero-dispersion wavelength of the DSF, in order to identify the DSF and the NZ-DSF. If it is assumed herein that a wavelength channel is configured for the zero-dispersion wavelength of the DSF, it becomes difficult to detect crosstalk occurring by four-wave mixing. Therefore, the use of the pseudo WDM signal in which the optical power in the zero-dispersion wavelength of the DSF is substantially zero enables accurate detection of crosstalk occurring in the zero-dispersion wavelength of the DSF.

Alternatively, a pseudo WDM signal in which the optical power in the zero-dispersion wavelength of the NZ-DSF is substantially zero may be used in place of the pseudo WDM signal in which the optical power in the zero-dispersion wavelength of the DSF is substantially zero. This case enables a determination as to whether the optical fiber between the optical node 1 and the adjacent node is the NZ-DSF or a fiber different from the NZ-DSF (the DSF or the SMF).

Figure 10:
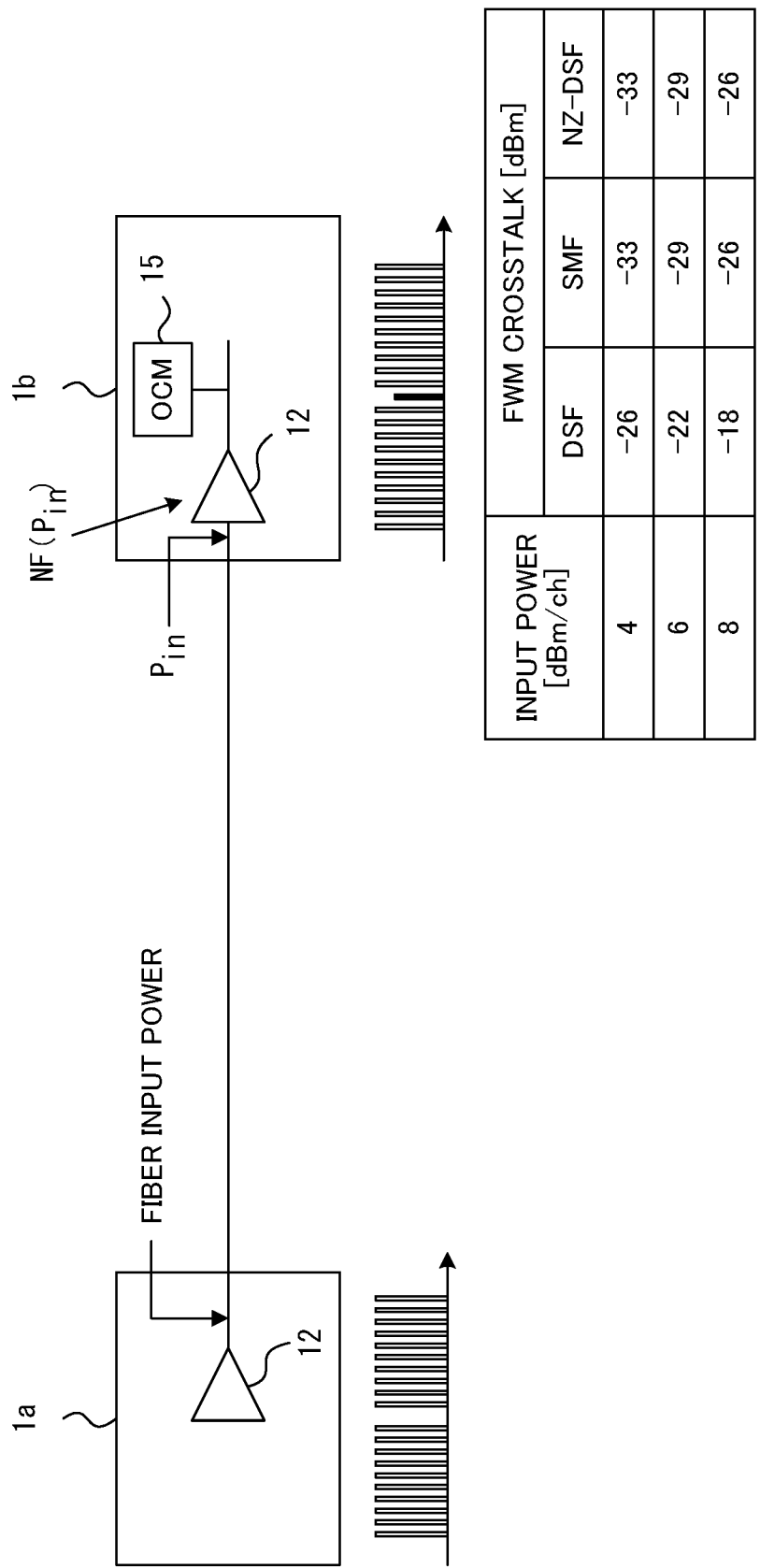
FIG. 10 illustrates an exemplary method for calculating crosstalk.

FIG. 10 illustrates an exemplary method for calculating crosstalk. In this example, the optical node 1a transmits the pseudo WDM signal illustrated in FIG. 9B to the optical node 1b. In the optical node 1b, the optical channel monitor 15 measures a ratio between average power of the wavelength channels (e.g., CH1 to CH10, CH12 to CH21) and power of the empty channel wavelength in the pseudo WDM signal. The optical component of the empty channel wavelength corresponds to noise for the wavelength channels CH1 to CH10 and CH12 to CH21. In the following description, therefore, the foregoing ratio may be referred to as "OSNR_OCM".

The determination unit 18a calculates crosstalk by four-wave mixing based on the OSNR_OCM obtained by the measurement. Specifically, the crosstalk FWMXT is expressed by formula (1). It should be noted that formula (1) is calculation of antilogarithm.

$$\frac{1}{FWMXT} = \frac{1}{OSNR\_OCM} - \frac{1}{OSNR\_AMP} \quad (1)$$

In formula (1), OSNR_AMP represents an optical signal-to-noise ratio of the optical amplifier circuit 12 that serves as a preamplifier in a reception node. The OSNR_AMP is calculated by formula (2). It should be noted that formula (2) is calculated in dB.

$$OSNR\_AMP = P\_in - NF(P\_in) - (-57.938 \text{ dBm}) \quad (2)$$

In formula (2), P_in represents input power in the reception node. For example, light that arrives at the optical node through the optical fiber RX illustrated in FIG. 3 is guided by the optical coupler C3 to the optical channel monitor 15. The optical channel monitor 15 is therefore capable of measuring the input power. Also in formula (2), NF represents a noise figure of the optical amplifier circuit 12 and is a function of the input power P_in. It is assumed herein that the characteristics of the NF are known. Therefore, the noise figure NF is calculated by measuring the input power P_in.

The crosstalk FWMXT is calculated by formula (1) and formula (2) above. The determination unit 18a determines that the optical fiber between the optical nodes 1a and 1b is the DSF when the crosstalk FWMXT is larger than a specified threshold value.

A transmission distance between the optical nodes 1a and 1b is known. It is assumed that the relationship between the fiber input power and the crosstalk is found in advance as illustrated in FIG. 10 for the transmission distance. The fiber input power corresponds to transmission power in a transmission node (the optical node 1a in FIG. 10).

For example, when the fiber input power is 4 dBm, the crosstalk of the DSF is −26 dBm, and the crosstalk of the optical fiber different from the DSF is −33 dBm. An intermediate value between the two values is defined as a threshold value. That is, the threshold value is −29.5 dBm. In this case, it is determined that the optical fiber between the optical nodes 1a and 1b is the DSF when the crosstalk is larger than −29.5 dBm. On the other hand, it is determined that the optical fiber between the optical nodes 1a and 1b is the optical fiber different from the DSF when the crosstalk is smaller than −29.5 dBm.

The zero-dispersion wavelength of the DSF may have variations. For this reason, when the empty channel wavelength is configured at 1550 nm, the empty channel in the pseudo WDM signal may be shifted from the zero-dispersion wavelength of the DSF. When the empty channel in the pseudo WDM signal is shifted from the zero-dispersion wavelength of the DSF, the reception node is incapable of accurately detecting the crosstalk. Hence, the optical node 1 transmits the pseudo WDM signal while gradually changing the empty channel wavelength in the vicinity of 1550 nm. And the reception node detects the crosstalk using this pseudo WDM signal. As a result, the crosstalk can be detected with good accuracy even when the zero-dispersion wavelength of the DSF has variations, so that a type of an optical fiber is determined with improved accuracy.

Figure 11:
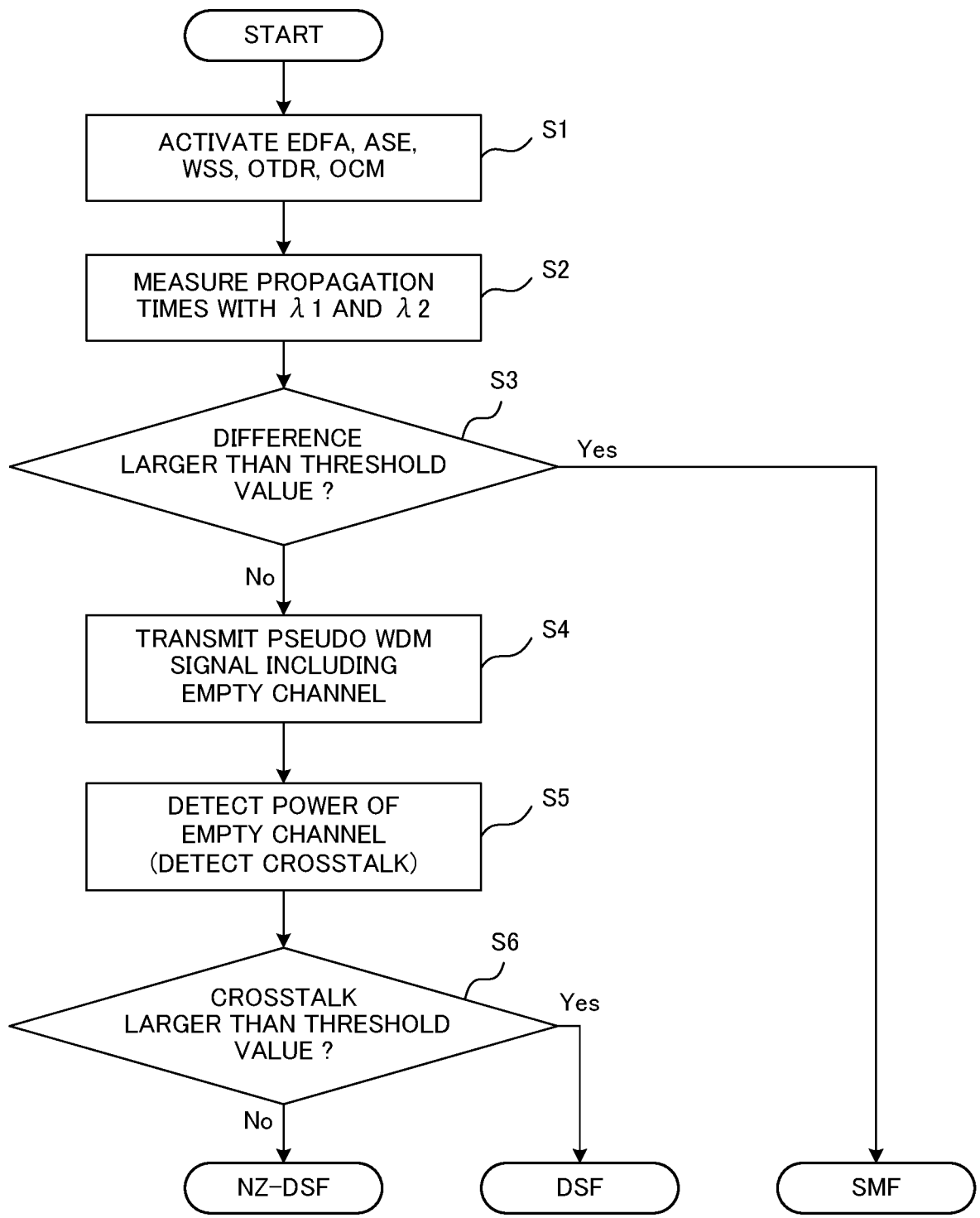
FIG. 11 is a flowchart illustrating an exemplary method for determining a type of an optical fiber.

FIG. 11 is a flowchart illustrating an exemplary method for determining a type of an optical fiber. Processing in this flowchart is executed by a pair of optical nodes. It is assumed in the following that the processing is executed by the optical nodes 1a and 1b illustrated in FIG. 2.

In step S1, the controller 18 activates the optical amplifier circuit (EDFA) 12, the ASE light source 17, the WSS 11, the OTDR 13, and the optical channel monitor (OCM) 15. This operation is performed in each of the optical nodes 1a and 1b.

In step S2, the OTDR 13 of the optical node 1a measures a propagation time between the optical node 1a and a specified discontinuity, using each of a wavelength λ1 and a wavelength λ2. As a result, a propagation time T1 and a propagation time T2 are respectively obtained for the wavelength λ1 and the wavelength λ2.

In step S3, the determination unit 18a of the optical node 1a determines whether a difference ΔT between the propagation time T1 and the propagation time T2 is larger than a specified threshold value TH1. When the difference ΔT is larger than the threshold value TH1, the determination unit 18a determines that the optical fiber between the optical nodes 1a and 1b is the SMF. On the other hand, when the difference ΔT is smaller than the threshold value TH1, the determination unit 18a determines that the optical fiber between the optical nodes 1a and 1b is a fiber different from the SMF (i.e., the DSF or the NZ-DSF).

When the difference ΔT is smaller than the threshold value TH1, in step S4, the controller 18 of the optical node 1a generates a pseudo WDM signal. Specifically, the controller 18 gives to the WSS 11 an instruction to generate a WDM signal including an empty channel. The empty channel has the same or almost the same wavelength as the zero-dispersion wavelength of the DSF. The WSS 11 processes ASE light in accordance with the instruction given by the controller 18, thereby generating the pseudo WDM signal. Thereafter, the optical node 1a causes the optical amplifier circuit 12 to amplify the pseudo WDM signal, and transmits the pseudo WDM signal to the optical node 1b.

In step S5, the optical node 1b receives the pseudo WDM signal. In the optical node 1b, the optical channel monitor 15 measures power of each wavelength channel and power of the empty channel in the pseudo WDM signal. The controller 18 calculates crosstalk FWMXT occurring at the optical fiber between the optical nodes 1a and 1b, based on a result of the measurement by the optical channel monitor 15. Thereafter, the optical node 1b reports the calculated crosstalk FWMXT to the optical node 1a.

In step S6, the determination unit 18a of the optical node 1a determines a type of the optical fiber between the optical nodes 1a and 1b, based on the crosstalk FWMXT reported from the optical node 1b. Specifically, when the crosstalk FWMXT is larger than a specified threshold value TH2, the determination unit 18a determines that the optical fiber between the optical nodes 1a and 1b is the DSF. On the other hand, when the crosstalk FWMXT is smaller than the specified threshold value TH2, the determination unit 18a determines that the optical fiber between the optical nodes 1a and 1b is a fiber different from the DSF (i.e., the SMF or the NZ-DSF). However, it is determined in step S3 that the optical fiber is different from the SMF. Therefore, when the crosstalk FWMXT is smaller than the specified threshold value TH2, it is determined that the optical fiber is the NZ-DSF.

In the example illustrated in FIG. 11, it is determined whether the optical fiber is the SMF, and then it is determined whether the optical fiber is the DSF; however, an embodiment of the present invention is not limited to this procedure. That is, it may be determined whether the optical fiber is the DSF, and then it may be determined whether the optical fiber is the SMF.

In the foregoing example, the optical node 1b detects the crosstalk, and the optical node 1a determines the type of the optical fiber based on the value of the crosstalk; however, an embodiment of the present invention is not limited to this procedure. For example, the optical node 1b which has received the pseudo WDM signal may determine the type of the optical fiber based on the crosstalk, and then may report a result of the determination to the optical node 1a.

According to an embodiment of the present invention, as described above, a pair of optical nodes cooperatively operates to determine a type of an optical fiber between the optical nodes. Therefore, a type of an optical fiber can be determined without a necessity that operators are positioned at nodes on two ends of a target optical fiber, resulting in labor and cost savings in a communication carrier. In many cases, an optical node such as a ROADM includes an ASE light source, a WSS, and an optical channel monitor. It is therefore unnecessary to add a component or a circuit dedicated for transmitting and receiving a pseudo WDM signal.

Figure 12:
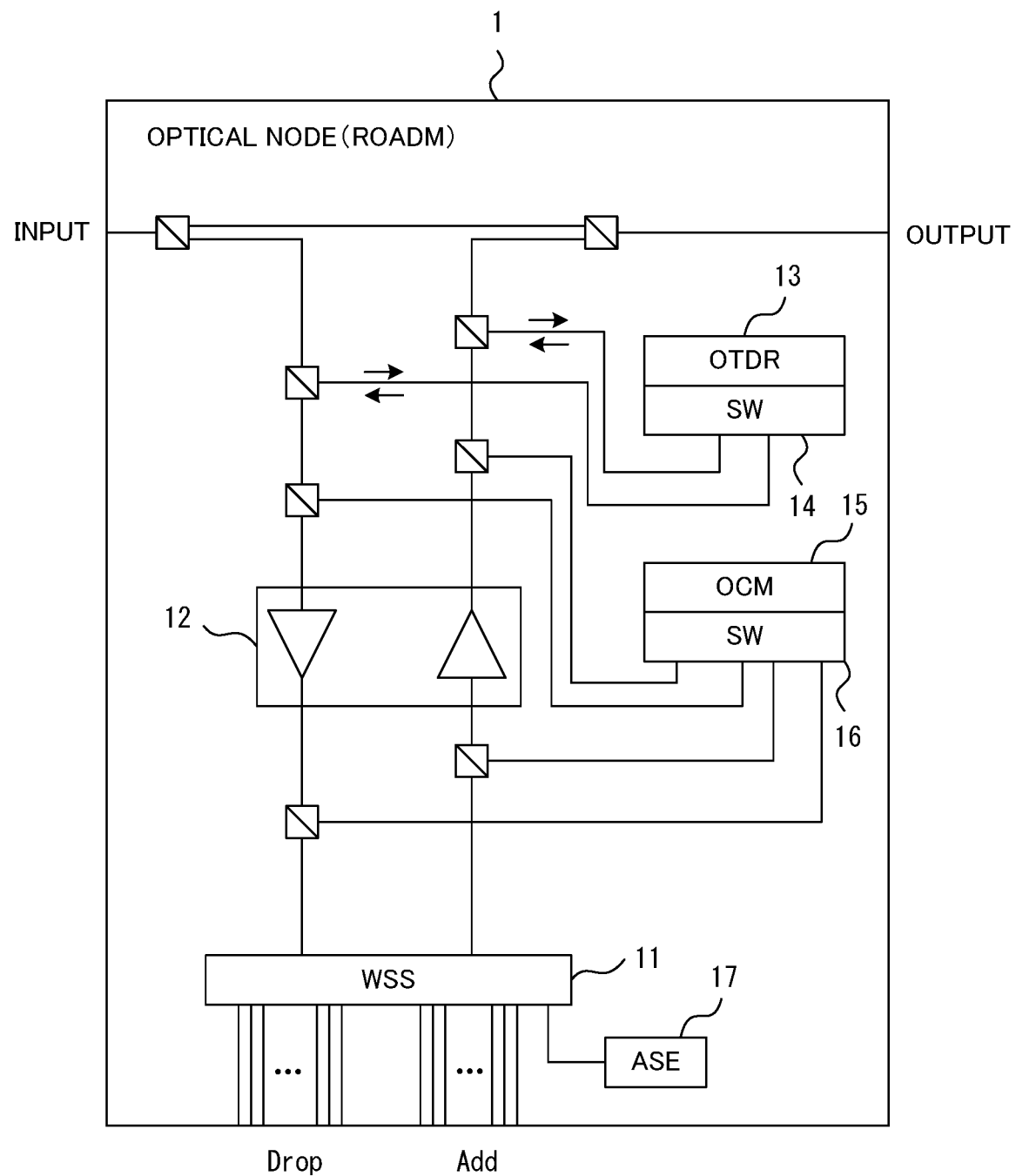
FIG. 12 illustrates another example of an optical node realized by a ROADM.

FIG. 12 illustrates another example of an optical node realized by a ROADM. The optical node illustrated in FIG. 12 have substantially the same configurations and operations as those of the optical node 1 illustrated in FIG. 3. It should be noted that FIG. 12 does not illustrate a controller 18.

Figure 13:
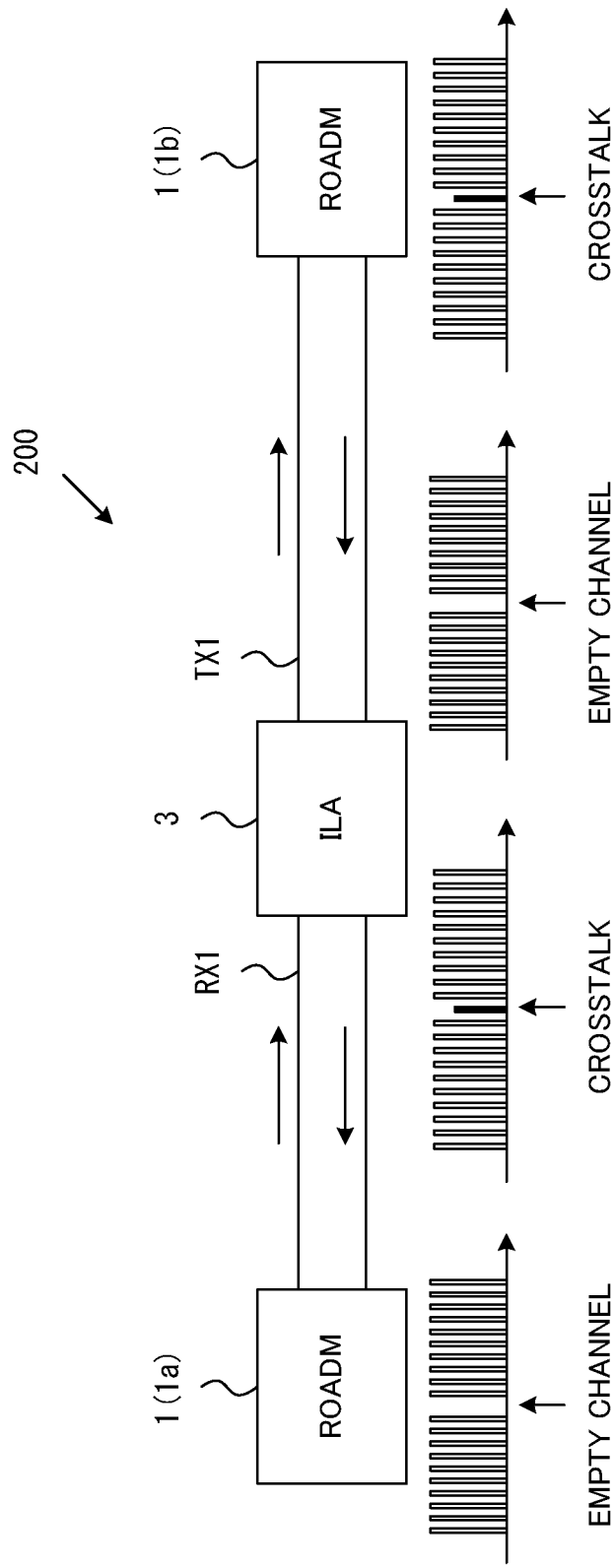
FIG. 13 illustrates another exemplary optical transmission system according to an embodiment of the present invention.

FIG. 13 illustrates another exemplary optical transmission system according to an embodiment of the present invention. The optical transmission system illustrated in FIG. 13 includes an optical node 3 realized by an in-line amplifier (ILA) in addition to the optical nodes 1 (1a, 1b) each realized by the ROADM illustrated in FIG. 2. The optical node 3 is operable as an optical relay station. Specifically, the optical node 3 amplifies an optical signal transmitted from the optical node 1a, and transmits the amplified optical signal to the optical node 1b. Likewise, the optical node 3 amplifies an optical signal transmitted from the optical node 1b, and transmits the amplified optical signal to the optical node 1a.

Figure 14:
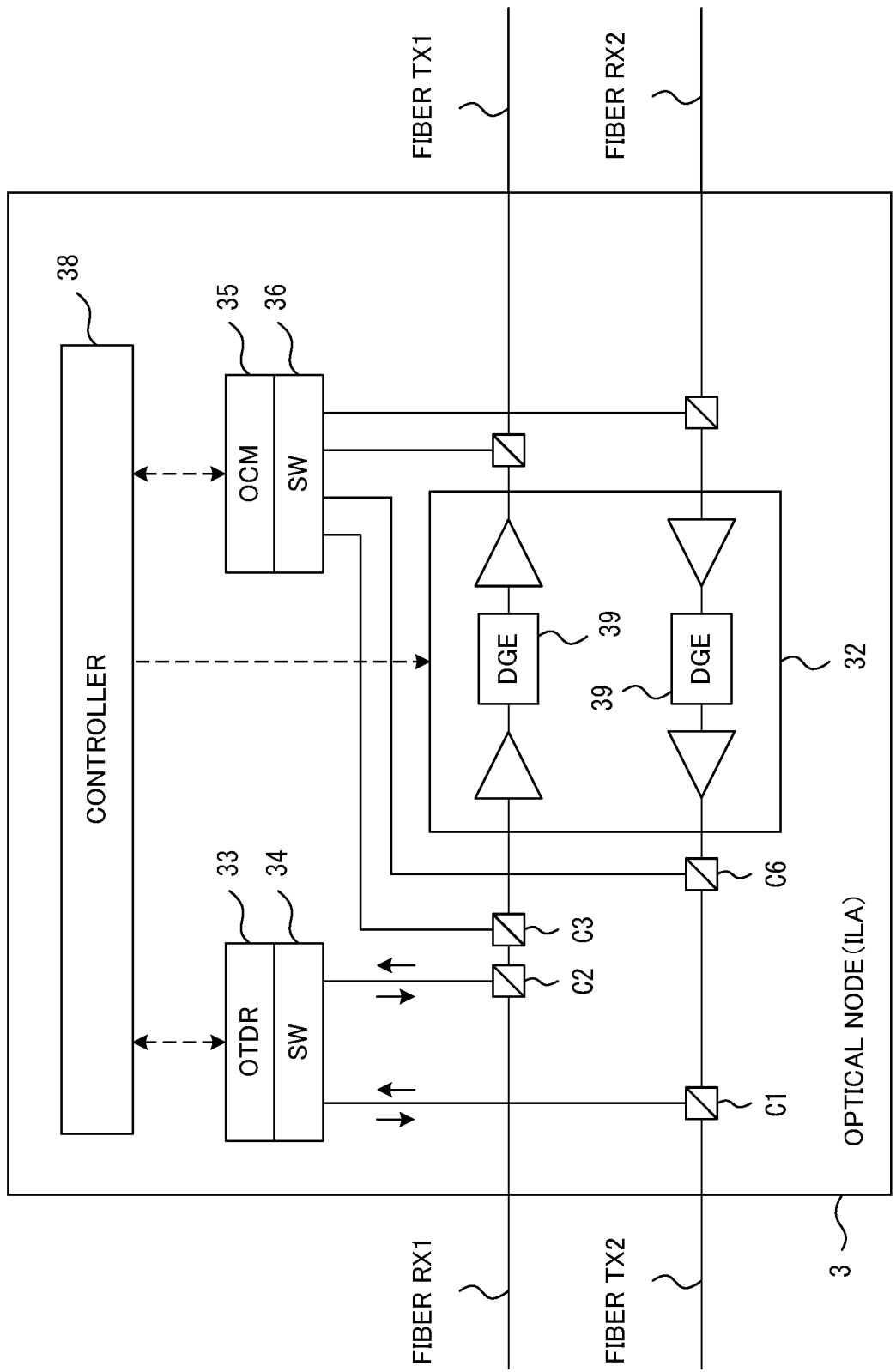
FIG. 14 illustrates an exemplary optical node operable as an optical relay station.

FIG. 14 illustrates an exemplary optical node operable as an optical relay station. The optical node 3 operable as the optical relay station includes an optical amplifier circuit 32, an OTDR 33, an optical switch 34, an optical channel monitor 35, an optical switch 36, and a controller 38. The OTDR 33, the optical switch 34, the optical channel monitor 35, and the optical switch 36 are substantially the same as the OTDR 13, the optical switch 14, the optical channel monitor 15, and the optical switch 16 illustrated in FIG. 3. It should be noted that the optical node 3 does not need to include the ASE light source 17 illustrated in FIG. 3. In this case, the optical node 3 does not generate the pseudo WDM signal illustrated in FIG. 9B.

As illustrated in FIG. 14, the optical amplifier circuit 32 includes a dynamic gain equalizer (DGE) 39 in addition to an optical amplifier such as an EDFA. The DGE 39 is capable of individually controlling power of each wavelength channel, in accordance with an instruction given by the controller 38. In this example, when the optical node 3 receives the pseudo WDM signal illustrated in FIG. 9B, the DGE 39 makes the power of the empty channel substantially zero. In other words, the DGE 39 interrupts or blocks the empty channel.

For example, as illustrated in FIG. 13, when the optical node 1a transmits the pseudo WDM signal to the optical node 1b, this pseudo WDM signal is relayed by the optical node 3. At this time, crosstalk occurs in an optical fiber RX1 between the optical node 1a and the optical node 3. Therefore, the optical channel monitor 35 of the optical node 3 measures power of the empty channel in the pseudo WDM signal (i.e., crosstalk). It can thus be determined whether the optical fiber RX1 is a DSF based on a level of the crosstalk.

In the optical node 3, the DGE 39 makes the power of the empty channel in the pseudo WDM signal zero. The optical node 3 transmits to the optical node 1b the pseudo WDM signal for which the power of the empty channel is made zero. In other words, a signal to be transmitted from the optical node 3 to the optical node 1b is substantially the same as a pseudo WDM signal that has been transmitted from the optical node 1a to the optical node 3. The optical node 1b is therefore capable of determining whether the optical fiber between the optical node 3 and the optical node 1b is the DSF.

Variation 1

Figure 15:
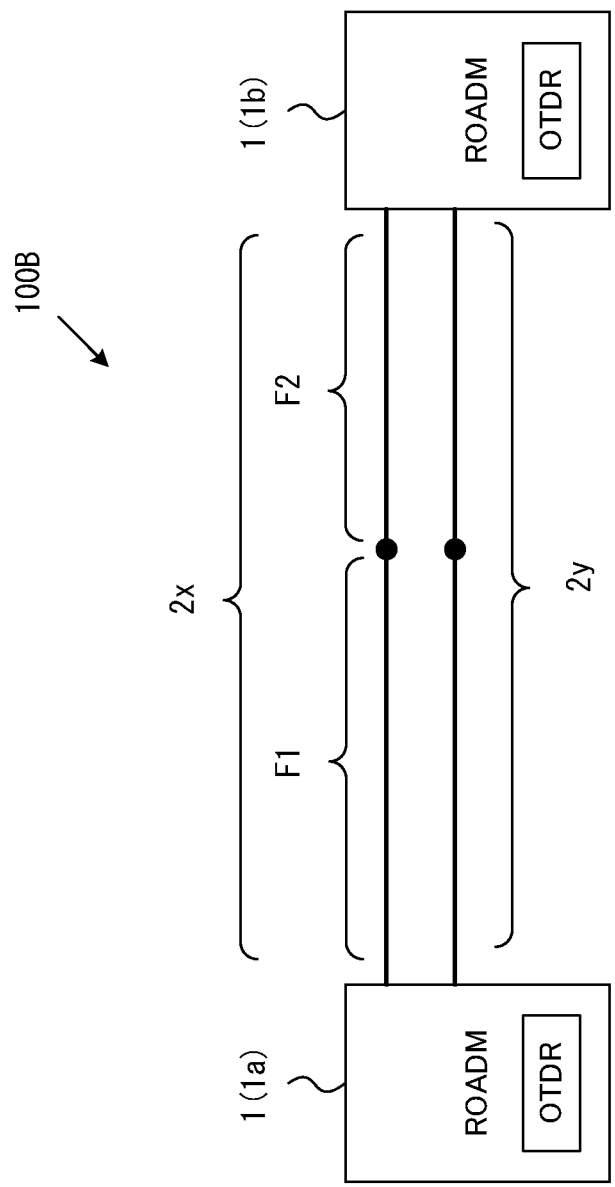
FIG. 15 illustrates an exemplary optical transmission system in which two types of optical fibers are mixed in one span.

In an optical transmission system 100B illustrated in FIG. 15, two types of optical fibers are laid on a span between optical nodes 1a and 1b. Specifically, an optical fiber 2x through which an optical signal propagates from the optical node 1a to the optical node 1b includes an optical fiber F1 and an optical fiber F2. The same applies to an optical fiber 2y through which an optical signal propagates from the optical node 1b to the optical node 1a. In this case, when an OTDR 13 implemented on the optical node 1a or 1b is used for measuring a propagation time, an average or total propagation time between the two optical fibers is merely obtained. It is therefore difficult to specify the types of the optical fibers. According to Variation 1, hence, the types of the optical fibers are specified using a front OTDR and a rear OTDR.

For example, the OTDR 13 implemented on the optical node 1a emits an optical pulse to the optical fiber F1, and measures the propagation time using reflected light from a discontinuity on the optical fiber. Likewise, the OTDR 13 implemented on the optical node 1b emits an optical pulse to the optical fiber F2, and measures the propagation time using reflected light from the discontinuity on the optical fiber. A connection between the optical fiber F1 and the optical fiber F2 corresponds to a discontinuity on an optical fiber and causes Fresnel reflection. The optical node 1a is therefore capable of determining whether the optical fiber F1 is an SMF. The optical node 1b is also capable of determining whether the optical fiber F2 is an SMF.

In an optical transmission system 100C illustrated in FIGS. 16A and 16B, an optical fiber 2x is laid, through which an optical signal propagates from an optical node 1a to an optical node 1b. The optical fiber 2x includes an optical fiber F1 and an optical fiber F2. In the example illustrated in FIG. 16A, the optical node 1a transmits a pseudo WDM signal to the optical node 1b, and an optical channel monitor of the optical node 1b detects crosstalk. In the example illustrated in FIG. 16B, the optical node 1b transmits a pseudo WDM signal to the optical node 1a, and an optical channel monitor of the optical node 1a detects crosstalk.

When the type of the optical fiber F1 is the same as the type of the optical fiber F2 (or when one optical fiber is laid between the optical nodes 1a and 1b), crosstalk to be detected in the optical node 1a is substantially the same as crosstalk to be detected in the optical node 1b. In the examples illustrated in FIGS. 16A and 16B, however, the crosstalk to be detected in the optical node 1a is different from the crosstalk to be detected in the optical node 1b. It is considered in this case that the type of the optical fiber F is different from the type of the optical fiber F2.

In an optical fiber, a level of crosstalk occurring by four-wave mixing depends on the intensity of propagating light. Specifically, crosstalk occurring in a region with high optical power is dominant.

Figure 16A:
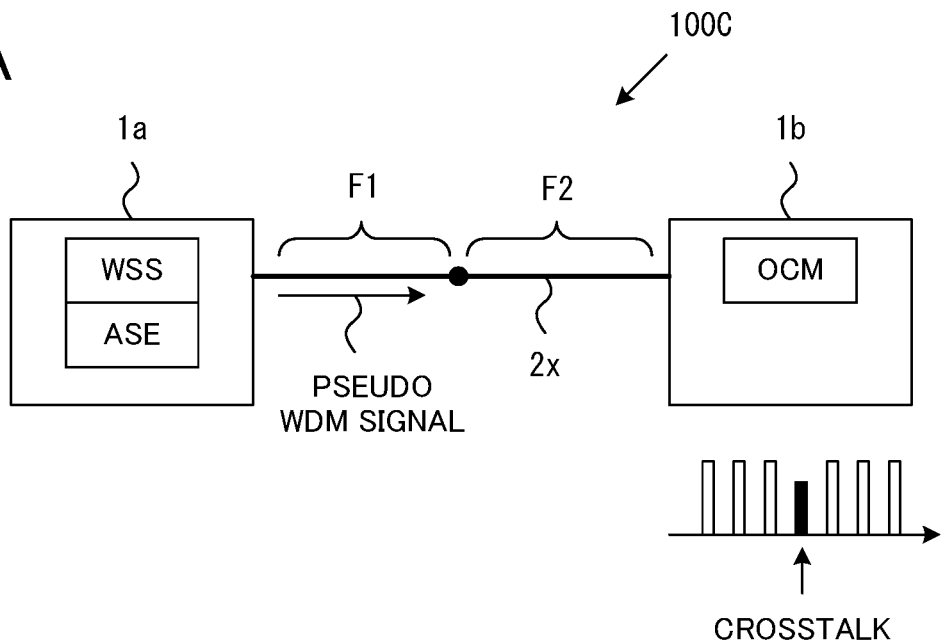
FIGS. 16A and 16B illustrate an exemplary method for identifying the two types of the optical fibers based on crosstalk.

In the case illustrated in FIG. 16A, a pseudo WDM signal generated by the optical node 1a is input to the optical fiber F1. Therefore, power of a pseudo WDM signal propagating through the optical fiber F1 is higher than power of a pseudo WDM signal propagating through the optical fiber F2. In this case, a level of the crosstalk to be detected in the optical node 1b depends on the type of the optical fiber F1. In this example, the crosstalk to be detected in the optical node 1b is sufficiently large. In this case, it is therefore determined that the optical fiber F1 is a DSF.

Figure 16B:
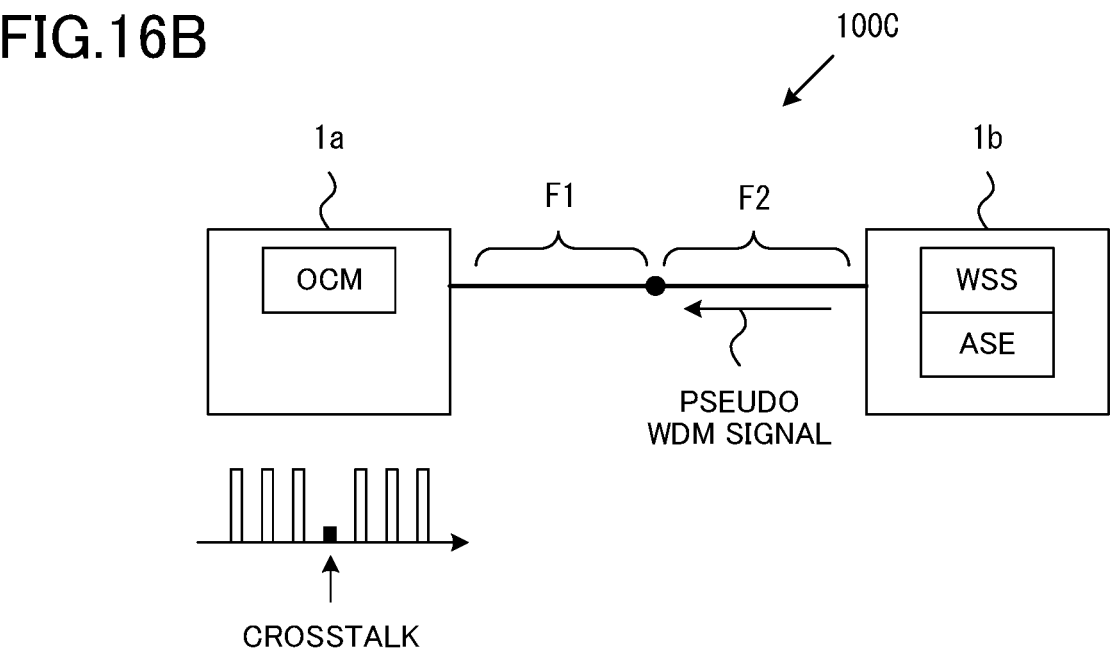

In the case illustrated in FIG. 16B, a pseudo WDM signal generated by the optical node 1b is input to the optical fiber F2. Therefore, the power of the pseudo WDM signal propagating through the optical fiber F2 is higher than the power of the pseudo WDM signal propagating through the optical fiber F1. In this case, a level of the crosstalk to be detected in the optical node 1a depends on the type of the optical fiber F2. In this example, the crosstalk to be detected in the optical node 1a is sufficiently small. In this case, it is therefore determined that the optical fiber F2 is different from the DSF.

It is determined whether each of the optical fibers F1 and F2 is an SMF, through the procedure illustrated in FIG. 15, as described above. Therefore, a combination of the procedure illustrated in FIG. 15 with the procedure illustrated in FIGS. 16A and 16B enables a determination as to whether each of the optical fibers F1 and F2 is the SMF, the DSF, or an NZ-DSF.

Figure 17:
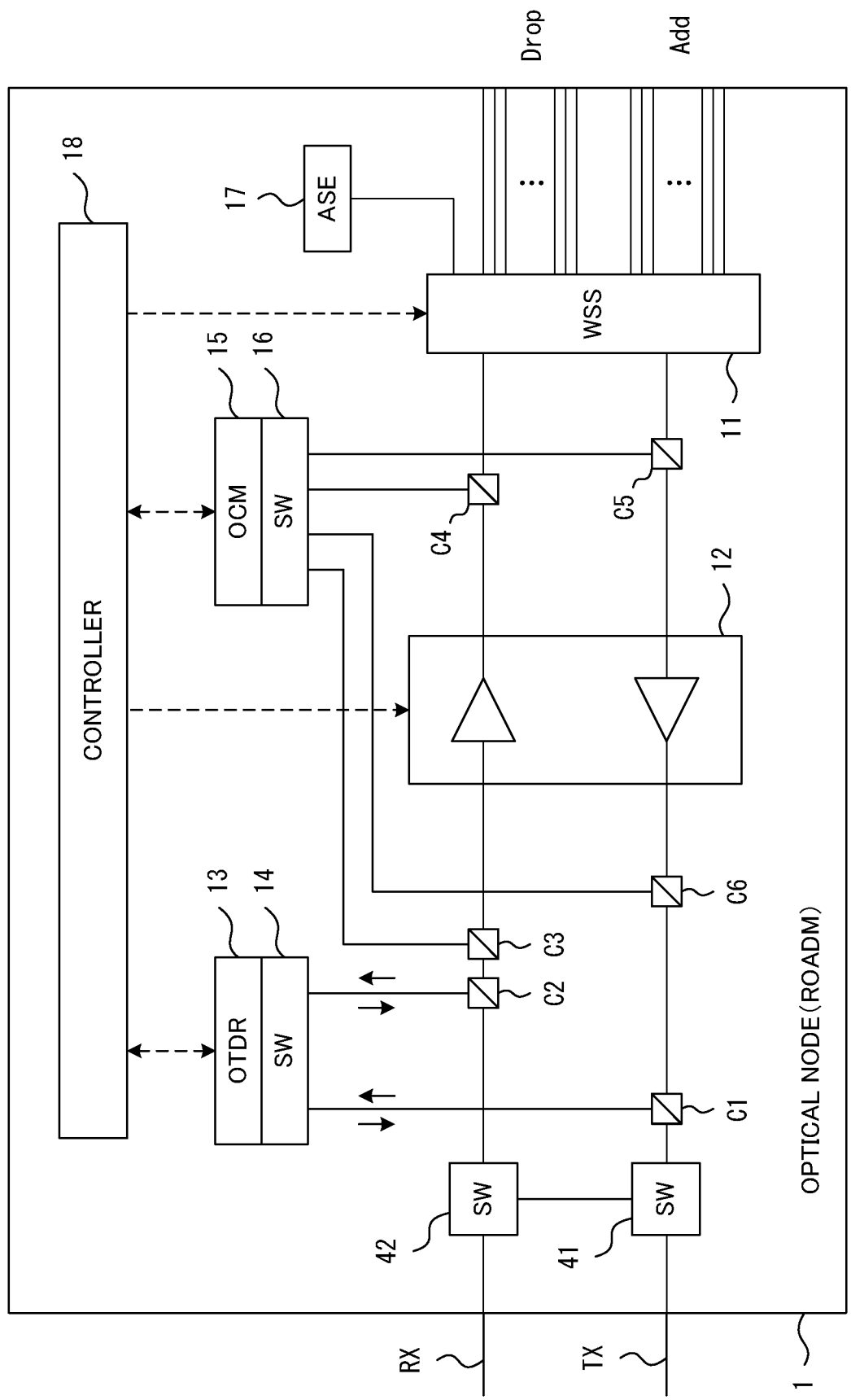
FIG. 17 illustrates an exemplary configuration of an optical node used in the optical transmission system illustrated in FIGS. 16A and 16B.

FIG. 17 illustrates an exemplary configuration of one of the optical nodes 1 used in the optical transmission system 100C illustrated in FIGS. 16A and 16B. In this case, the optical node 1 is required to transmit a pseudo WDM signal not only to an optical fiber for transmitting an optical signal (an optical fiber TX in FIG. 17) but also to an optical fiber for receiving an optical signal (an optical fiber RX in FIG. 17). The optical node 1 therefore includes optical switches 41 and 42.

In inputting a pseudo WDM signal to the optical fiber TX, the optical switch 41 is controlled to guide a pseudo WDM signal generated by the WSS 11 to the optical fiber TX. In inputting a pseudo WDM signal to the optical fiber RX, the optical switch 41 is controlled to guide the pseudo WDM signal generated by the WSS 11 to the optical switch 42, and the optical switch 42 is controlled to guide the pseudo WDM signal to the optical fiber RX. It should be noted that the optical switches 41 and 42 are controlled by the controller 18.

Variation 2

As described above, each optical node 1 is capable of determining a type of an optical fiber connected thereto. The communication carrier configures wavelength channels in a WDM signal in accordance with the type of the optical fiber in order to improve communication quality. According to Variation 2, the optical node 1 makes this setting automatically.

FIGS. 18A-18D illustrate an exemplary method for controlling transmission power of a WDM signal in accordance with a type of an optical fiber. It is assumed in this example that each optical node 1 transmits a WDM signal. The controller 18 sets average transmission power of a plurality of wavelength channels constituting the WDM signal and a tilt compensation amount of the WDM signal, in accordance with a type of an optical fiber connected to the optical node 1. For example, the tilt compensation amount is set such that the spectrum of the WDM signal becomes flat in a reception node.

The optical node 1 includes a parameter table illustrated in FIG. 18A. The parameter table stores a value of transmission power of each wavelength channel for each optical fiber type. In this case, a value of transmission power may be prepared for a combination of a type of an optical fiber with a transmission distance. In a case where two types of optical fibers are mixed in one span, a value of transmission power may be prepared for a combination of the two types of the optical fibers.

For example, in a case where the optical fiber connected to the optical node 1 is an SMF, as illustrated in FIG. 18B, a tilt is formed in each signal wavelength band (C-band, L-band) such that power of a channel with a longer wavelength becomes smaller than power of a channel with a shorter wavelength. In the following description, a pattern of the transmission power set for the SMF may be referred to as a "reference pattern".

In a case where the optical fiber connected to the optical node 1 is a DSF, as illustrated in FIG. 18C, transmission power in the C-band is set to be smaller than the reference pattern, and transmission power in the L-band is set to be larger than the reference pattern. In a case where the optical fiber connected to the optical node 1 is an NZ-DSF, as illustrated in FIG. 18D, transmission power in the C-band is set to be equal to the reference pattern, and transmission power in the L-band is set to be smaller than the reference pattern.

The settings of transmission power may be realized by the WSS 11 and the optical amplifier circuit 12. Specifically, the transmission power is controlled by the controller 18 to set parameters for the WSS 11 and the optical amplifier circuit 12. In this case, the controller 18 sets parameters for controlling the power of each wavelength channel, for the WSS 11. The tilt of the WDM signal is formed by this setting. In addition, the controller 18 controls a gain of the optical amplifier circuit 12. The average power of the WDM signal is thus controlled.

Variation 3

As described above, in determining a type of an optical fiber using a pseudo WDM signal, a pair of optical nodes 1 implemented on two ends of the target optical fiber cooperatively operates. At this time, each optical node 1 transmits a control signal using an optical supervisory channel (OSC).

Figure 19:
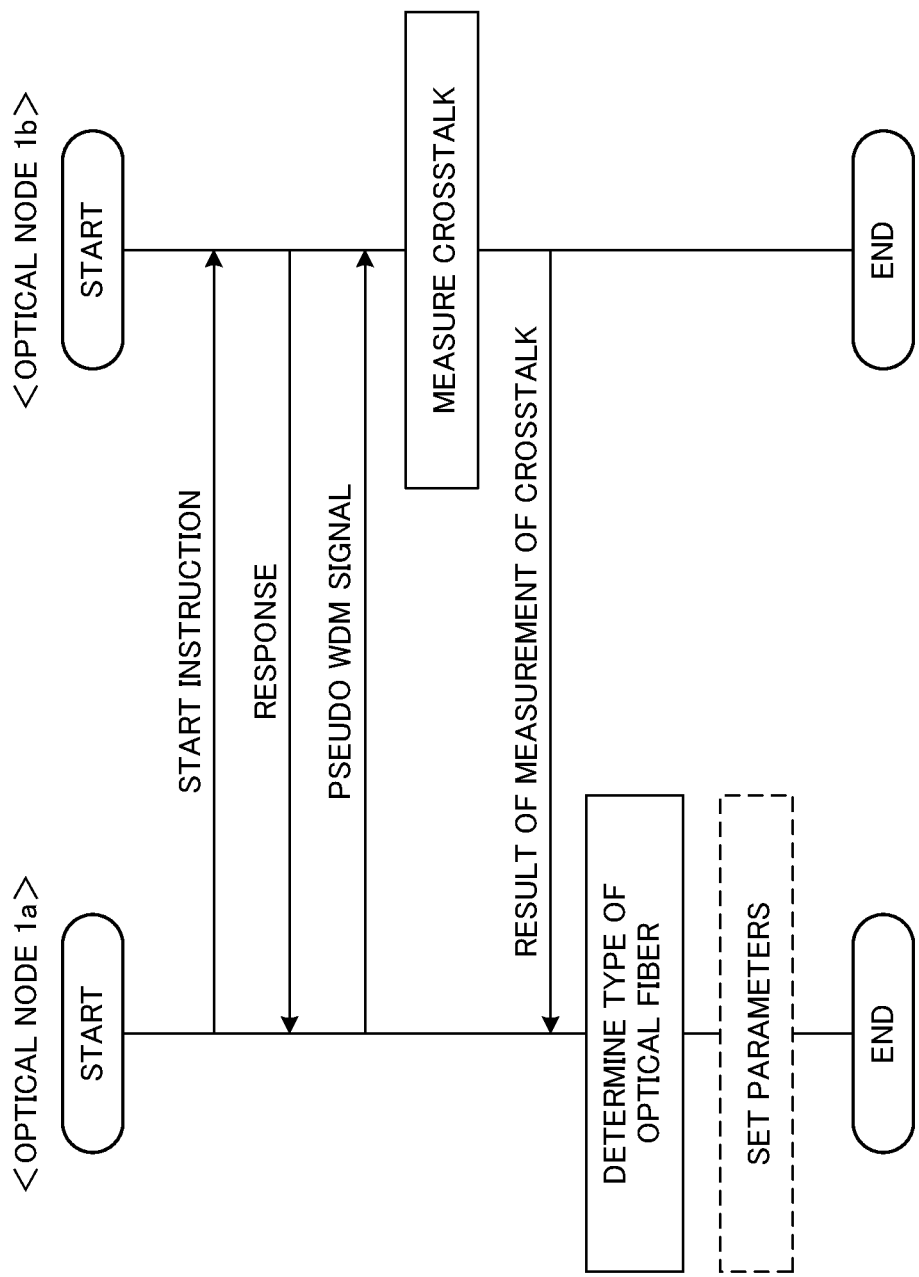
FIG. 19 illustrates an exemplary sequence of cooperative operation by a set of optical nodes.

FIG. 19 illustrates an exemplary sequence of cooperative operation by a pair of optical nodes. In this example, the optical node 1a determines a type of the optical fiber between the optical nodes 1a and 1b.

Figure 20:
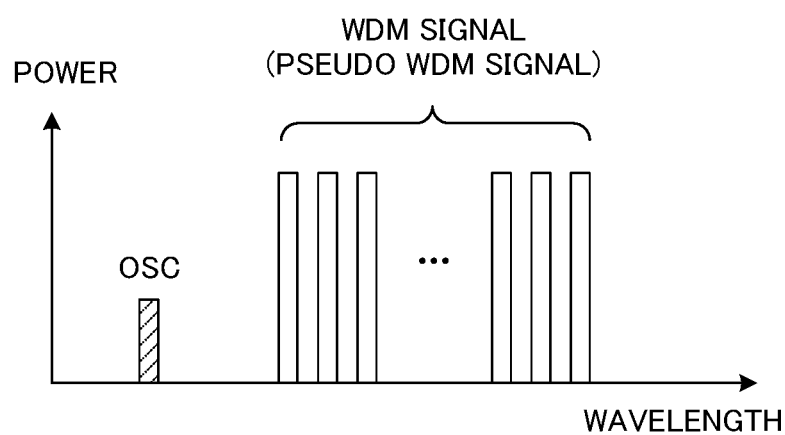
FIG. 20 illustrates an exemplary arrangement of an OSC.

First, the optical node 1a transmits to the optical node 1b an instruction to start measurement of crosstalk. This start instruction is transmitted using the OSC. As illustrated in FIG. 20, for example, the OSC is set outside a signal band for transmitting a WDM signal. When receiving the start instruction, the optical node 1b prepares for reception of a pseudo WDM signal. Thereafter, the optical node 1b transmits a response signal to the optical node 1a using the OSC.

When receiving the response signal, the optical node 1a transmits a pseudo WDM signal to the optical node 1b. The pseudo WDM signal is generated by the ASE light source 17 and the WSS 11, based on an instruction from the controller 18, as described above. The optical node 1b measures crosstalk caused by four-wave mixing using the pseudo WDM signal. The optical node 1b then reports a result of the measurement of the crosstalk to the optical node 1a, using the OSC.

The optical node 1a determines a type of the optical fiber between the optical nodes 1a and 1b, based on the measurement result of the crosstalk reported from the optical node 1b. The result of the determination is displayed on, for example, a computer of the communication carrier. Thereafter, the optical node 1a may set parameters for the optical transmission circuit (such as the WSS 11 and the optical amplifier circuit 12) of the optical node 1a in accordance with the type of the optical fiber.

In the example illustrated in FIG. 19, the optical node 1b reports the result of the measurement of the crosstalk in optical node 1a, and the optical node 1a determines the type of the optical fiber, based on the result of the measurement of the crosstalk; however, an embodiment of the present invention is not limited to this sequence. For example, the optical node 1b may measure the crosstalk and then determine the type of the optical fiber based on a result of the measurement. In this case, the optical node 1b reports a result of the determination as to the type of the optical fiber to the optical node 1a, using the OSC.

Figure 21:
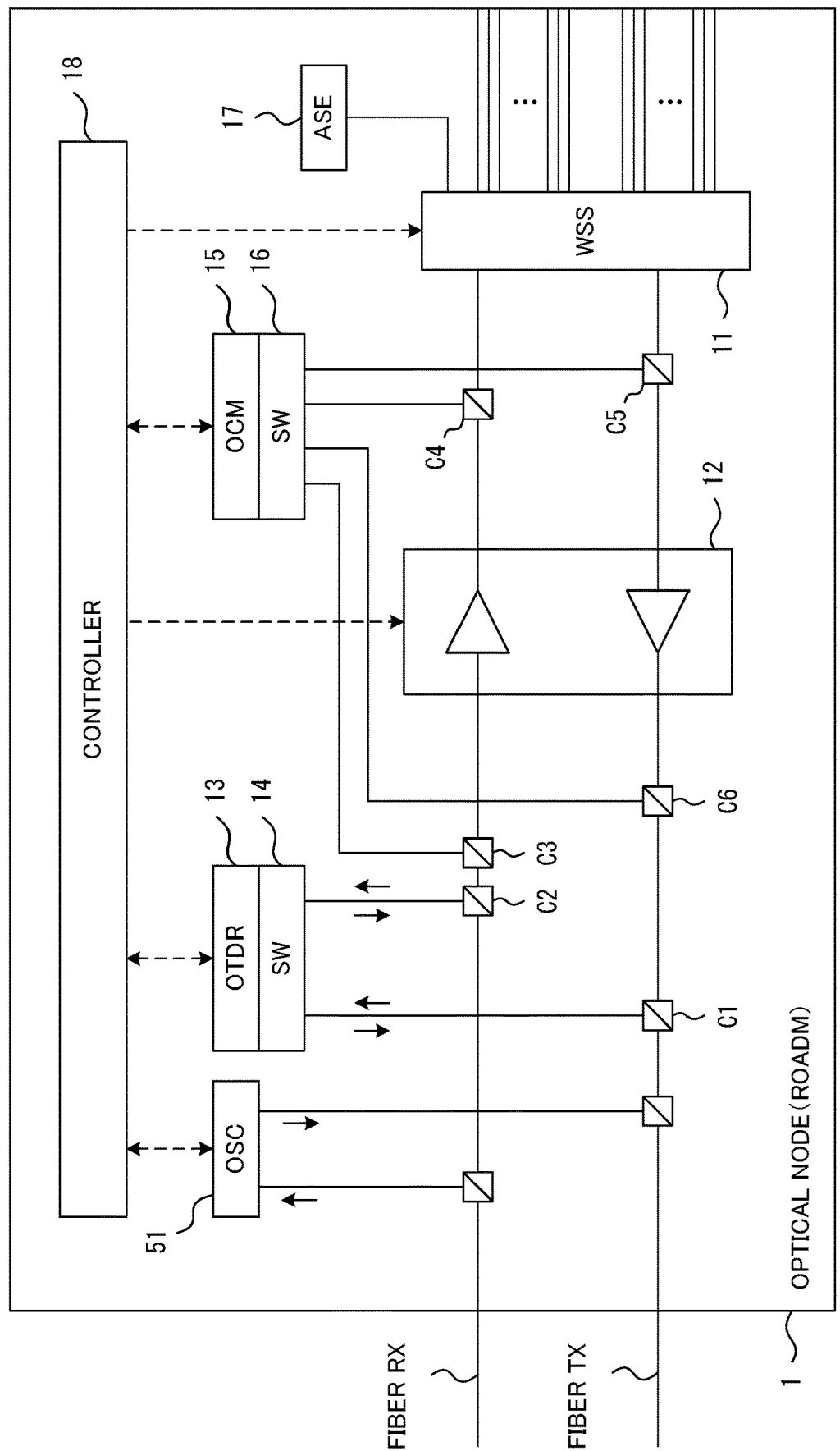
FIG. 21 illustrates an exemplary optical node including an OSC processor.

FIG. 21 illustrates an exemplary optical node including an OSC processor. An optical node 1 illustrated in FIG. 21 includes an OSC processor 51 in addition to the configurations illustrated in FIG. 3. The OSC processor 51 transmits an optical signal indicating a control signal generated by a controller 18. In the example illustrated in FIG. 19, the OSC processor 51 transmits an OSC optical signal indicating a start instruction. In addition, the OSC processor 51 receives an OSC optical signal transmitted from another node, extracts a control signal from this OSC optical signal, and sends the control signal to the controller 18. In the example illustrated in FIG. 19, the OSC processor 51 receives a response and a result of measurement of crosstalk from the optical node 1b.

Variation 4

In the examples illustrated in FIGS. 8-10, it is determined whether a target optical fiber is a DSF, by measuring crosstalk using a pseudo WDM signal. According to Variation 4, in contrast, it is determined whether a target optical fiber is an SMF, a DSF, or an NZ-DSF, by changing a configuration of a pseudo WDM signal.

Figure 22:
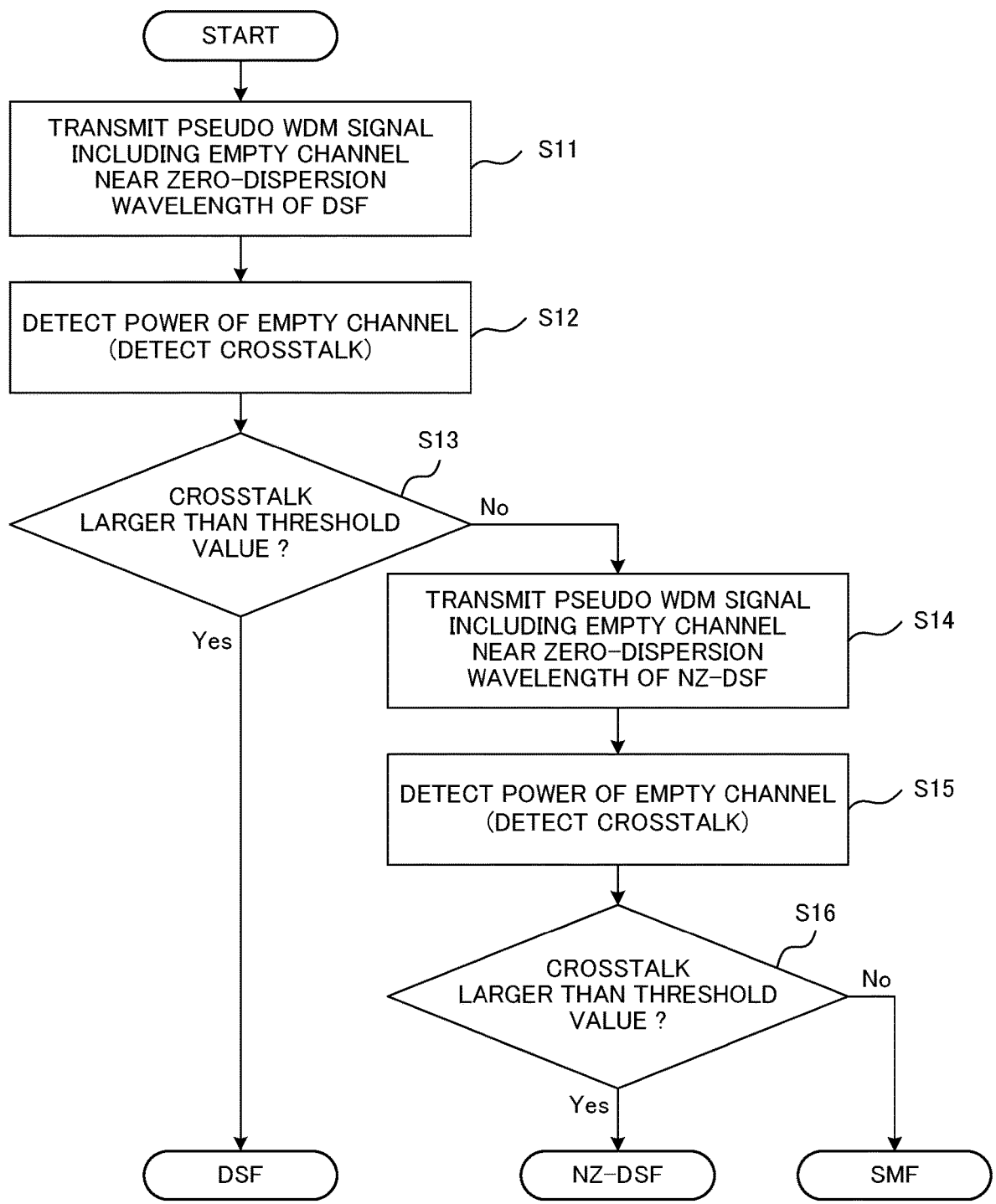
FIG. 22 is a flowchart illustrating an exemplary method for identifying an SMF, a DSF, and an NZ-DSF, using a pseudo WDM signal.

FIG. 22 is a flowchart illustrating an exemplary method for identifying an SMF, a DSF, and an NZ-DSF, using a pseudo WDM signal. It should be noted that steps S11-S13 are substantially the same as steps S4-S6 in the flowchart illustrated in FIG. 11. Specifically, the controller 18 makes the ASE light source 17 and the WSS 11 to generate a pseudo WDM signal including an empty channel near the zero-dispersion wavelength of the DSF. This pseudo WDM signal is transmitted to an adjacent node through the target optical fiber. In the adjacent node, crosstalk is calculated by measuring power of the empty channel. As described above with reference to FIGS. 9A-9D, it is determined that the target optical fiber is the DSF when this crosstalk is larger than a specified threshold value.

Figure 23A:
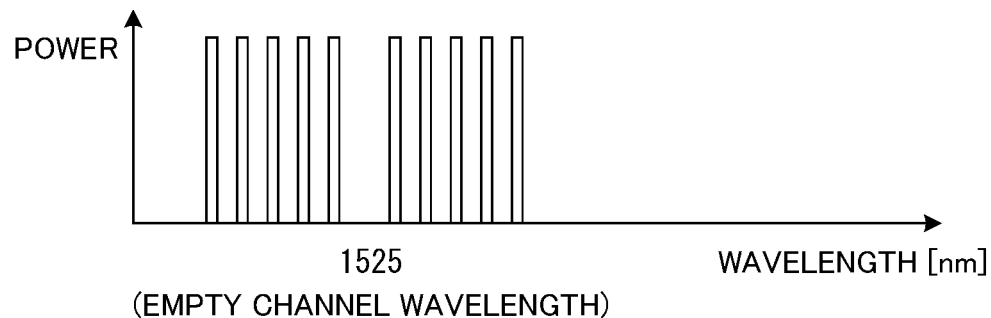
FIGS. 23A-23C illustrate another exemplary method for determining a type of a fiber based on crosstalk.

In step S14, the controller 18 makes the ASE light source 17 and the WSS 11 to generate a pseudo WDM signal including an empty channel near the zero-dispersion wavelength of the NZ-DSF. In this example, as illustrated in FIG. 23A, the zero-dispersion wavelength of the NZ-DSF is approximately 1500 nm, and the wavelength of the empty channel is 1525 nm. The pseudo WDM signal including this empty channel is transmitted to the adjacent node through the target optical fiber.

Figure 23B:
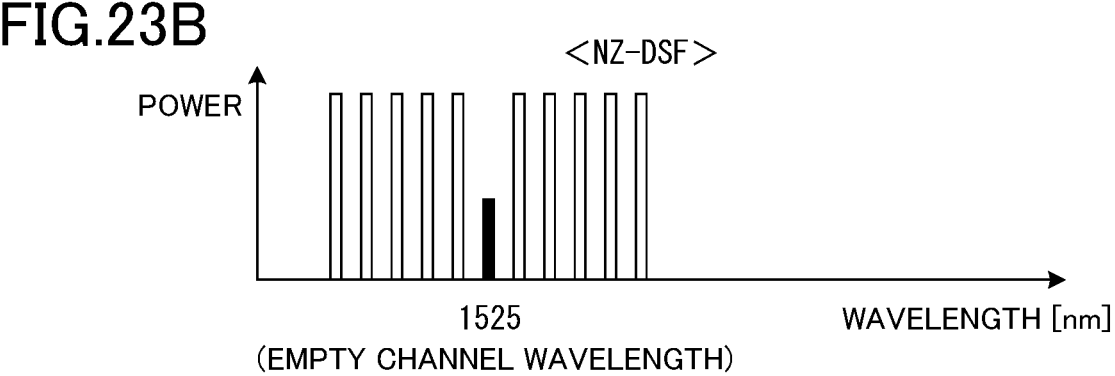
Figure 23C:
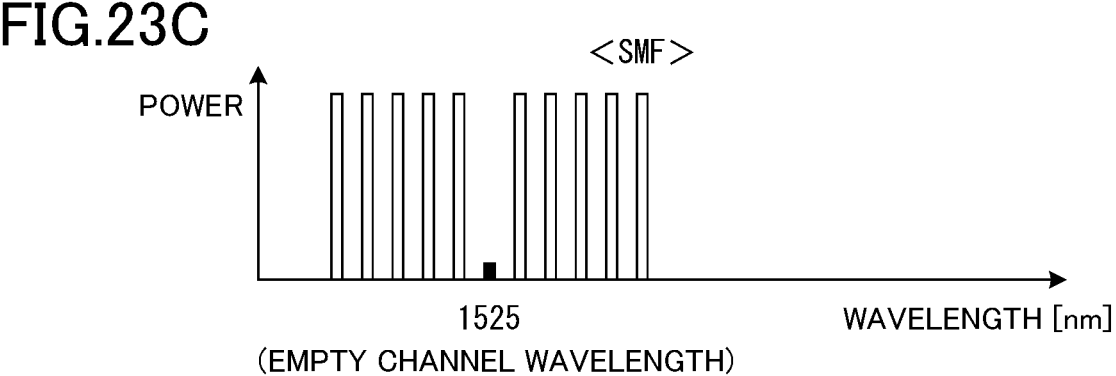

In step S15, the controller 18 of the adjacent node makes the optical channel monitor 15 to measure power of the empty channel, thereby calculating crosstalk caused by four-wave mixing. In step S16, the determination unit 18a of the optical node 1 or the determination unit 18a of the adjacent node compares the crosstalk obtained in step S15 with a specified threshold value. This threshold value is preferably set independently of the threshold value used in step S13. It is determined that the target optical fiber is the NZ-DSF when the crosstalk obtained in step S15 is larger than the threshold value as illustrated in FIG. 23B. On the other hand, it is determined that the target optical fiber is the SMF when the crosstalk obtained in step S15 is smaller than the threshold value as illustrated in FIG. 23C. According to Variation 4, as described above, an optical fiber provided between optical nodes can be identified as an SMF, a DSF, or an NZ-DSF, without use of an OTDR.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission system that includes a first optical node, a second optical node, and an optical fiber provided between the first optical node and the second optical node, the optical transmission system comprising:
   a signal generator provided in the first optical node and configured to generate an optical signal including a plurality of wavelength channels and an empty channel;
   an optical transmission circuit provided in the first optical node and configured to output the optical signal to the optical fiber;
   an optical channel monitor provided in the second optical node and configured to measure reception powers of each wavelength channel of the plurality of wavelength channels in the optical signal received through the optical fiber; and
   a processor configured to
      calculate crosstalk in a wavelength in which the empty channel is provided, the crosstalk occurring due to the plurality of wavelength channels in the optical fiber, based on a ratio between the reception powers of the plurality of wavelength channels and a reception power of the empty channel, and determine a type of the optical fiber based on a level of the crosstalk.

2. The optical transmission system according to claim 1, wherein
the empty channel is provided in a zero-dispersion wavelength of a dispersion shifted single-mode optical fiber or near the zero-dispersion wavelength of the dispersion shifted single-mode optical fiber, and
the processor determines whether the optical fiber is the dispersion shifted single-mode optical fiber based on the reception power of the empty channel.

3. The optical transmission system according to claim 1, wherein
the empty channel is provided in a zero-dispersion wavelength of a non-zero dispersion shifted single-mode optical fiber or near the zero-dispersion wavelength of the non-zero dispersion shifted single-mode optical fiber, and
the processor determines whether the optical fiber is the non-zero dispersion shifted single-mode optical fiber based on the reception power of the empty channel.

4. The optical transmission system according to claim 1, wherein
the signal generator includes: an ASE light source configured to generate ASE light; and
a wavelength selective switch configured to generate the optical signal from the ASE light.

5. The optical transmission system according to claim 1, wherein
the processor is provided in the first optical node,
the second optical node reports a result of measurement by the optical channel monitor to the first optical node, and
the processor determines the type of the optical fiber based on the result of the measurement reported from the second optical node.

6. The optical transmission system according to claim 1, wherein
the first optical node further includes an optical measuring device configured to emit to the optical fiber a first optical pulse in a first wavelength and a second optical pulse in a second wavelength and to detect reflected light of the first optical pulse from a discontinuity on the optical fiber and reflected light of the second optical pulse from the discontinuity on the optical fiber, and
the processor determines whether the optical fiber is a single-mode optical fiber based on a difference between a first propagation time and a second propagation time, the first propagation time indicating a period from a transmission of the first optical pulse to a detection of the reflected light of the first optical pulse from the discontinuity and the second propagation time indicating a period from a transmission of the second optical pulse to a detection of the reflected light of the second optical pulse from the discontinuity.

7. The optical transmission system according to claim 1, further comprising
an optical relay station provided between the first optical node and the second optical node, wherein
the optical relay station blocks the empty channel in relaying the optical signal to the second optical node.

8. The optical transmission system according to claim 1, wherein
the second optical node includes:
a second signal generator configured to generate a second optical signal including a plurality of wavelength channels and an empty channel; and
a second optical transmission circuit configured to output the second optical signal to the optical fiber,
the first optical node includes a second optical channel monitor configured to measure reception power of each channel in the second optical signal received through the optical fiber, and
the processor determines the type of the optical fiber based on the reception power of the empty channel in the optical signal measured by the optical channel monitor, and the reception power of the empty channel in the second optical signal measured by the second optical channel monitor.

9. The optical transmission system according to claim 8, wherein
when the reception power of the empty channel in the optical signal measured by the optical channel monitor is different from the reception power of the empty channel in the second optical signal measured by the second optical channel monitor, the processor
determines that the optical fiber includes a first optical fiber and a second optical fiber that is different in type from the first optical fiber, and
determines a type of the first optical fiber and a type of the second optical fiber based on the reception power of the empty channel in the optical signal measured by the optical channel monitor and the reception power of the empty channel in the second optical signal measured by the second optical channel monitor.

10. The optical transmission system according to claim 1, wherein
the processor is provided in the first optical node and controls transmission power of each wavelength channel in a wavelength division multiplexing signal to be transmitted to the second optical node in accordance with the determined type of the optical fiber.

11. A fiber type determination method for determining a type of an optical fiber provided between a first optical node and a second optical node, the fiber type determination method comprising:
transmitting an optical signal including a plurality of wavelength channels and an empty channel from the first optical node to the second optical node through the optical fiber;
measuring, in the second optical node, reception powers of each wavelength channel of the plurality of wavelength channels in the optical signal received through the optical fiber;
calculating crosstalk in a wavelength in which the empty channel is provided, the crosstalk occurring due to the plurality of wavelength channels in the optical fiber, based on a ratio between the reception powers of the plurality of wavelength channels and a reception power of the empty channel; and
determining a type of the optical fiber based on a level of the crosstalk.

* * * * *